(12) United States Patent
Hansen, III et al.

(10) Patent No.: US 6,460,567 B1
(45) Date of Patent: Oct. 8, 2002

(54) SEALED MOTOR DRIVEN VALVE

(75) Inventors: Charles C. Hansen, III, Hinsdale; John A. Yencho, Elmhurst; Martin F. Kozi, Lombard; Orval J. Kuhn, Jr., Warrenville, all of IL (US)

(73) Assignee: Hansen Technologies Corpporation, Burr Ridge, IL (US)

( * ) Notice: Subject to any disclaimer, the term of this patent is extended or adjusted under 35 U.S.C. 154(b) by 0 days.

(21) Appl. No.: 09/449,243

(22) Filed: Nov. 24, 1999

(51) Int. Cl.[7] .................... F16K 37/00; H02K 29/08; H02P 7/36
(52) U.S. Cl. ............... 137/554; 137/627.5; 137/625.48; 251/129.11; 251/282; 318/254
(58) Field of Search .................. 137/554, 627.5, 137/625.48; 251/129.11, 129.12, 129.13, 266, 282; 384/576; 318/254

(56) References Cited

U.S. PATENT DOCUMENTS

| | | | |
|---|---|---|---|
| 2,470,470 A | * 5/1949 | Carbon | 251/129.11 X |
| 3,850,196 A | 11/1974 | Fales | |
| 3,892,447 A | * 7/1975 | Gruber et al. | 384/576 |
| 4,341,370 A | * 7/1982 | Banks | 251/282 |
| 4,392,094 A | * 7/1983 | Kuhnlein | 318/254 |
| 4,494,051 A | * 1/1985 | Bailey | 318/254 |
| 4,593,881 A | 6/1986 | Yoshino | |

(List continued on next page.)

FOREIGN PATENT DOCUMENTS

| | | |
|---|---|---|
| CH | 231313 | 6/1944 |
| DE | 512667 | 11/1930 |
| EP | 0203846 A1 | 12/1986 |
| EP | 0383353 A2 | 8/1990 |
| GB | 2310480 A | 8/1997 |
| JP | 59187180 | 10/1984 |
| JP | 1261580 | 10/1989 |
| JP | 3260482 | 11/1991 |
| JP | 07-217761 A | 8/1995 |
| JP | 08-219317 | 8/1996 |
| RU | 138116 | 1/1961 |

OTHER PUBLICATIONS

Search Report Prepared by the British Patent Office on Apr. 26, 2001.

*Primary Examiner*—John Rivell
(74) *Attorney, Agent, or Firm*—Gardner Carton & Douglas

(57) ABSTRACT

Disclosed is a motor operated valve including a valve body with an inlet and outlet and a valve seat therebetween. A valve core reciprocates between open and closed positions by threads of the valve core cooperating with threads on a shaft which rotates with the armature of the motor. The armature has a plurality of spaced apart permanent magnets, a bearing assembly, and is enclosed by a magnetically transparent enclosure closed at one end and hermetically sealed at its other end to the valve body. Lying closely outside the enclosure is a drive stator that includes drive windings and plural Hall-effect devices for commutation of the windings.

49 Claims, 18 Drawing Sheets

U.S. PATENT DOCUMENTS

| | | |
|---|---|---|
| 4,609,176 A | 9/1986 | Powers |
| 4,641,812 A | 2/1987 | Vanderlaan et al. |
| 4,650,156 A | 3/1987 | Kawahira |
| 4,672,992 A | 6/1987 | Vanderlaan et al. |
| 4,697,125 A * | 9/1987 | Goff et al. .................. 318/254 |
| 4,703,545 A | 11/1987 | Kawahira |
| 4,723,753 A | 2/1988 | Torimoto et al. |
| 4,751,438 A * | 6/1988 | Markunas ................... 318/254 |
| 4,773,822 A | 9/1988 | Jensen et al. |
| 4,793,377 A | 12/1988 | Haynes et al. |
| 4,794,309 A * | 12/1988 | Saito et al. .................... 318/9 |
| 4,903,936 A | 2/1990 | Kajiwara |
| 5,011,112 A | 4/1991 | Glamm |
| 5,035,264 A | 7/1991 | Amico et al. |
| 5,040,568 A * | 8/1991 | Hair et al. ............. 137/625.65 |
| 5,052,656 A | 10/1991 | Katayama |
| 5,060,910 A | 10/1991 | Iwata et al. |
| 5,062,611 A | 11/1991 | Hatton |
| 5,083,744 A | 1/1992 | Reinicke et al. |
| 5,085,401 A | 2/1992 | Botting et al. |
| 5,146,126 A | 9/1992 | Hutchins |
| 5,148,070 A * | 9/1992 | Frye et al. ................... 310/168 |
| 5,159,268 A * | 10/1992 | Wu .......................... 324/207.2 |
| 5,173,651 A * | 12/1992 | Buckley et al. ......... 310/254 X |
| 5,318,064 A | 6/1994 | Reinicke |
| 5,325,005 A * | 6/1994 | Denk ....................... 310/68 B |
| 5,364,066 A | 11/1994 | Dorste et al. |
| 5,372,351 A | 12/1994 | Oliver |
| 5,382,890 A * | 1/1995 | Moh et al. ................... 318/254 |
| 5,540,414 A | 7/1996 | Giordani et al. |
| 5,547,344 A | 8/1996 | Sugiyama et al. |
| 5,659,214 A | 8/1997 | Guardiani et al. |
| 5,690,144 A * | 11/1997 | Takahashi ............... 137/625.43 |
| 5,694,010 A * | 12/1997 | Oomura et al. ............. 318/254 |
| 5,769,390 A | 6/1998 | Ando |
| 6,034,499 A * | 3/2000 | Tranovich ............... 318/254 X |
| 6,145,540 A * | 11/2000 | Linkner, Jr. ............ 137/625.65 |

* cited by examiner

SEALED MOTOR DRIVEN VALVE

BACKGROUND OF THE INVENTION

The present invention relates to electric motor-driven valves, and particularly, to so-called canned motors preferably using a threaded armature extension to drive the valve core within a valve body and commutated by Hall-effect devices, with the windings and Hall-effect devices ordinarily being enclosed within a second, atmosphere-tight enclosure. The valve housing may comprise a two-way valve, a three-way valve, a pressure-balanced valve or a multi-port valve, as used for example in heat exchange or industrial refrigeration.

The invention also relates to supplying current to the field windings in a unique manner, resulting in a unique armature movement adapted not only to achieve maximum torque in the motor, but also to do so without any thermal overload on the field windings and bearings, whereby the motor may be operated indefinitely without failure.

Still further, and in another aspect, the invention relates to the use in such combination of ball or like bearings wherein the bearings are caged by a PTFE composition capable of furnishing relatively permanent lubrication to the bearings, and thus giving them relative immunity from conditions that would otherwise be detrimental to extended bearing life.

Electric motor-operated valves have heretofore been used in many embodiments, some of which used stem and packing sealing in conjunction with geared, shaded pole or similar motors. This type of valve had its driving motor mounted external to the valve and was connected to the valve core via a stem which incorporated various packing type sealing arrangements designed to contain the fluids within the valve enclosure. Often these sealing arrangements were the first elements to fail in service and leak due to wear, dirt, or corrosion. In some cases, these packings would leak even in new condition. The end result was leakage of fluid from the valve to the atmosphere, or of the atmosphere into the process fluid handled by the valve.

Many valve applications, particularly in the chemical, petroleum, biological, pharmaceutical, industrial refrigeration, or environmental industries cannot tolerate measurable leaks or fugitive emissions from valves in the process loop. Fluid emissions may be dangerous or toxic, or the fluids may simply be precious or sensitive to contamination, for example.

In some valve applications having small torque requirements, an improvement was made in regard to leakage by employing stepping motors mounted wholly within the valve enclosure, thus eliminating the stem and packing and its associated leakage potential. This, however, exposed the rotor, windings and associated wiring to the process fluids. Compatibility between the process fluids and the motor limited the number of fluids acceptable in valves of this type. In those limited applications wherein a stepper motor was compatible with and safe for the process fluids, significant advantages were realized: no stem or packing was required; an increased precision of positioning was available; good motor reliability was obtained at reduced cost and size; and a simple control scheme could be used.

However, entry of control and power wires into the valve-pressurized fluid envelope presented reliability and cost difficulties. Stepping motors have not been able to be applied to control ports larger than about ¼" in diameter without internal gearing or additional commutation complexity, largely due to the inability of stepping motors to remain stalled under load, and their tendency to lose torque capability if synchronization is lost due to power losses or system forces.

Additionally, the close stator and rotor radial clearances required for small step angle stepper motors prohibits the use of a hermetic, pressure containing magnetically transparent metal can in the magnetic gap. As a practical matter, this then requires the windings to be immersed in the process fluid. This in turn limited the application to those cases wherein the fluid is compatible with the motor windings and currents in question.

A need has therefore developed for a small, compact but high torque motor capable of driving relatively large valve mechanisms to open and close valve ports, wholly or incrementally, and hold the valve mechanisms in a desired position in response to an external control signal.

Additionally, a need has developed for a motor which is able to operate in a hermetically pressure sealed condition to prevent leakage of fluids from a fluid system in which the valve operates, especially at the motor/valve interface. Further, a need has developed for a motor-operated valve for use in a fluid system that is able to operate for longer periods of time without failure when the fluid in the system is corrosive or acts as a solvent to remove material or lubricants from metal, plastic, ceramic or other surfaces that come in contact with the process fluid or with each other within the valve mechanism.

It is therefore, an object of the invention, generally stated, to provide a new and improved motor-driven valve.

Another object of the present invention is to provide a motor-operated valve having a motor producing a higher torque/lower heat relationship than has been heretofore known.

An additional object of the present invention is to provide a motor-operated valve having an operating life which is much longer than that heretofore known.

Yet another object of the invention is to provide a valve having a logical and simplified arrangement of components to provide ease and simplicity of servicing or periodic maintenance.

Still another object of the present invention is to provide a motor having a permanent magnet-containing armature or rotor within a magnetically transparent can, and which includes windings and Hall-effect devices located outside the can, with the field and the Hall-effect devices enclosed within a second can or protective closure which is also sealed to the valve body.

A further object of the present invention is to provide a sealed motor which includes only four electrical conductors passing in a sealed relation through the outermost impervious shell to operate a circuit board located between the shells containing the motor controllers therein.

A still further object of the present invention is to provide a valve core for engaging a seat in the valve body, with the valve core being made from a composite PTFE material or the like and having a valve seating surface made from a hard, wear-resistant material.

An additional object of the present invention is to provide a valve core which is adapted to reciprocate into and out of contact with an annular seat by reason of having threads therein and whose axial motion is insured by a groove and pin arrangement, and whose core is urged axially into and out of registration by a threaded shaft that is secured to said armature and which rotates therewith.

A still further object is to provide a quarter-turn type valve wherein the operator is a canned motor and the valve is turned by the combination of a threaded shaft and a wheel, scotch yoke or other mechanism having a portion attached to the valve.

Another object of the present invention is to provide a motor having a sealed or canned armature and lying within the member comprising the seal, a bearing assembly having an inner and outer race, a plurality of roller elements and a cage securing said bearing elements in position, with the cage comprising a composite PTFE or similar wear-resistant, lubricous material, whereby the bearings have a greatly increased life in relation to other bearings presented to the same environment.

Yet another object of the present invention is to provide a valve operating motor which includes inner and outer leak-proof containers, which containers and other elements including the valve core, may be removed in sequence as a matter of maintenance or replacement, without disturbing the valve body.

Still another object of the present invention is to provide a method of controlling a brushless DC motor in operation, which method comprises intermittently furnishing high current pulses to the windings energizing the armature with a relatively long interval between pulses, at which time said armature is not subject to undesirable heat build-up.

A further object of the present invention is to provide a method of operating a brushless DC motor which enables said motor to provide maximum torque indefinitely, yet which is not in danger of failing from excessive thermal overload.

A still further object of the present invention is to provide a sealed motor and a valve core positioning controller wherein the armature and the valve body as well as a position sensing element are surrounded in part by the armature and whereby the armature, the driven rotary shaft and the position indicating element lie within a first sealed housing, and the position sensor, the drivers and the field for the motor lie outside the first housing.

An additional object of the present invention is to provide a motor drive arrangement which includes a rotary screw and a threaded valve core adapted to move within a valve body, with the arrangement of valve components being such that the unit may be adaptable to a number of valve arrangements, including those using single or multiple inlets/outlets.

Another object of the present invention is to provide a sealed motor and valve arrangement wherein the armature is journaled by a graphite containing bearing at one end and by the novel roller/ball bearing at the other end.

Yet another object of the present invention is to provide a motorized valve arrangement wherein the movable portion of the valve core comprises a mixing or diverting valve with a valve core in an intermediate position to allow mixing or diverting of process fluids.

Still another object of the present invention is to provide a sealed motor having a magnetically transparent enclosure for the armature, with the armature having a threaded interior stem portion with a position sensor on one end of the stem and a valve core on the other end of the stem.

The present invention achieves its other objects and advantages which are inherent therein by providing a valve body having at least one inlet and at least one outlet, a valve seat therebetween, and, in several embodiments, at least one valve core which reciprocates between open and closed positions of the valve seat and is moved between positions by threads in the core cooperating with threads on a shaft which rotates with the armature, the armature having a plurality of spaced apart permanent magnets embedded therein, a plurality of drive stator windings and Hall-effect devices commutating the windings, with a sealed, magnetically transparent can between the armature and the stator, and preferably, the entire motor being enclosed within a second housing lying outside the stator and also enclosing the drive circuitry. In other embodiments, the rotary shaft indirectly operates various types of quarter-turn valves.

The manner in which these and other objects and advantages are achieved in practice will become more apparent when reference is made to the following description of the preferred embodiments of the invention and shown in the accompanying drawings, wherein like reference numbers indicate corresponding parts throughout.

DESCRIPTION OF THE PREFERRED EMBODIMENTS OF THE INVENTION

Figure 1:
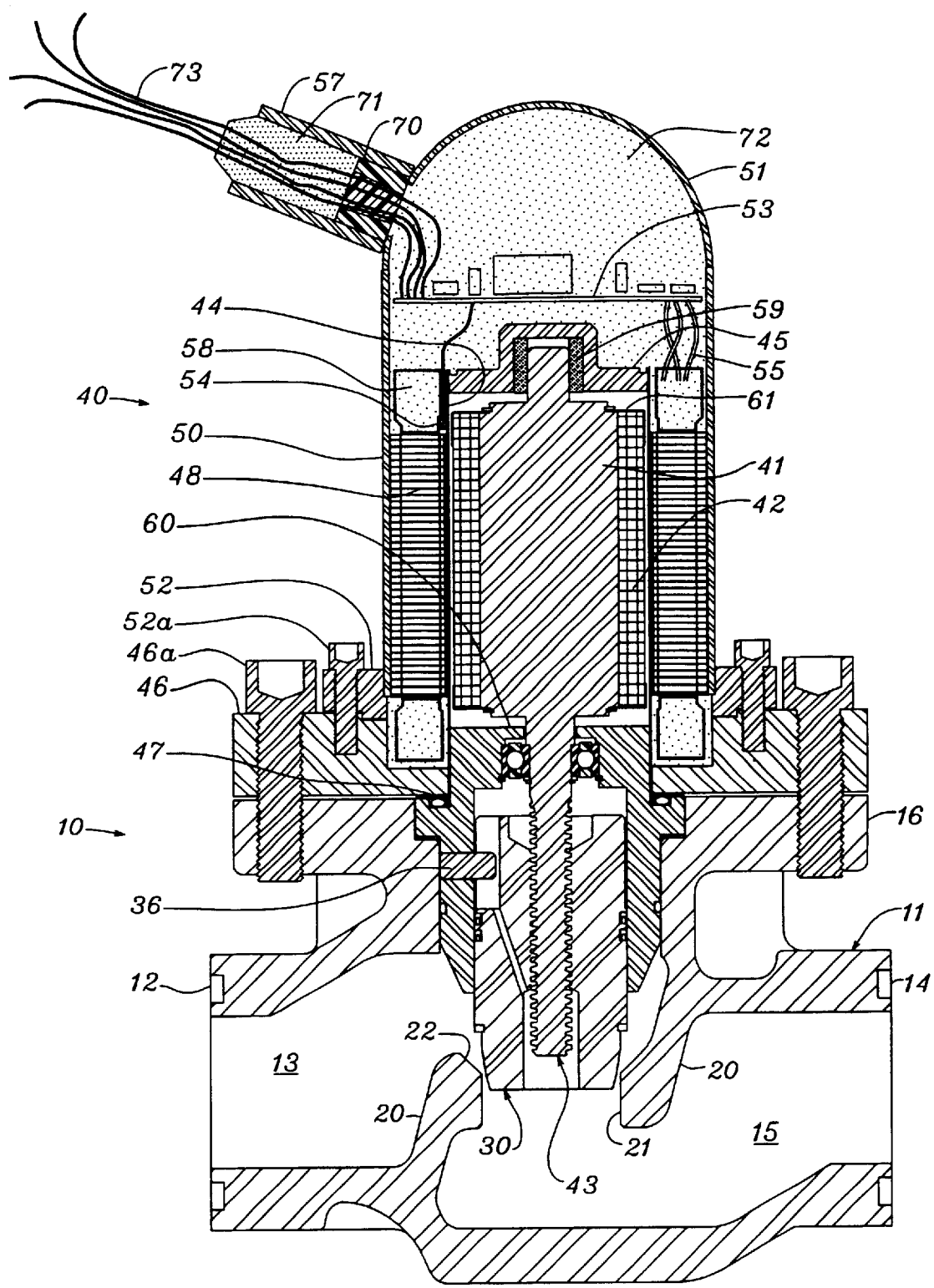
FIG. 1 is a vertical sectional view of a sealed motor-operated two-way valve according to the embodiment of the present invention.

Referring now to FIG. 1, one embodiment of the present invention is shown to lie in a sealed motor driven valve assembly generally designated 10 which includes a positively driven, pressure balanced valve assembly 10 used to control the flow of fluids. The valve assembly 10 includes a valve body 11 of a flow-through design having an annular inlet flange 12 defining an inlet passage 13 extending centrally thereof into and partially across the valve body 11. On the opposing side of valve body 11 is an annular outlet flange 14 defining an outlet port 15, which extends inwardly partially through the valve body therefrom. The valve body 11 further includes an annular electric motor mounting flange generally designated 16 centrally positioned on top of valve body 11.

In the center portion of the valve body 11 is a dividing wall 20 that separates the inlet port 13 from the outlet port 15. In the center of the dividing wall 20 is a circumferentially extending surface defining an angled valve seat 22 that extends about the passage 21.

Figure 1A:
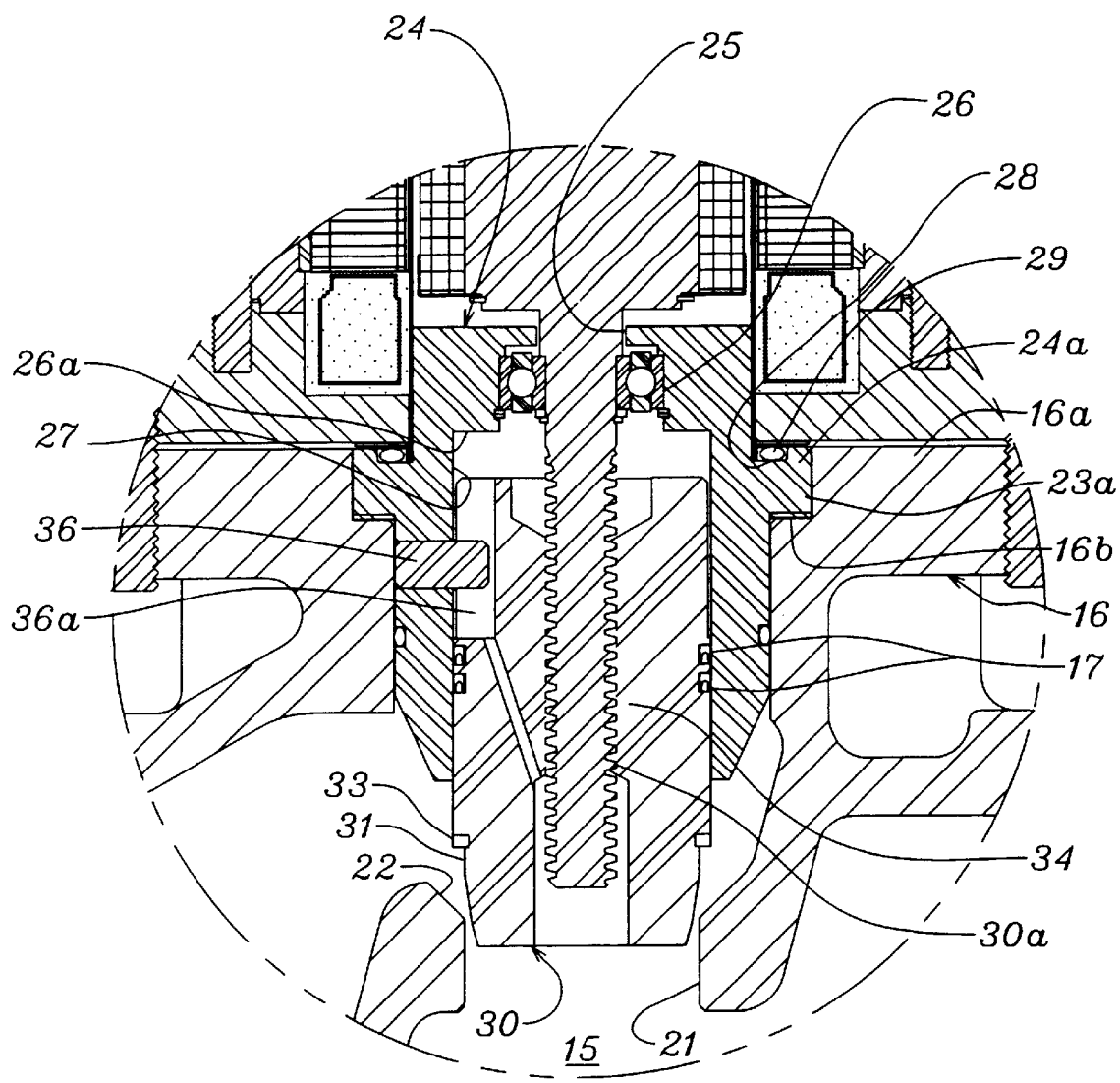
FIG. 1A is an enlarged sectional view of the valve core and related elements of FIG. 1.

Referring now particularly to FIG. 1A, the annular electric motor mounting flange generally designated 16 at the top center of the valve body 11 includes a main central bore 23 extending vertically downwardly thereof, and an enlarged diameter counterbore portion 23a which terminates at the top annular surface 16a of the flange generally designated 16. The counterbore 23a extends from the top surface 16a of the motor mounting flange downwardly and terminates at a shoulder 16b. A generally hollow cylindrical cartridge generally designated 24, is held in the counterbore 23a by an enlarged diameter shoulder portion 24a which includes a groove 28 for receiving an O-ring seal 29. The cartridge 24 also includes a central shaft receiving bore 25, a first, bearing-receiving counterbore 26 and below that a further enlarged second counterbore 27.

A substantially cylindrical valve core generally indicated at 30, is designed to move axially, but not to rotate in the second counterbore 27. The valve core includes a hollow annular bottom portion 31 having a predetermined geometry which, in this case, provides a controlled progression of increase in effective area between the inlet port 13 and the outlet port 15 when the valve core 30 moves upwardly (axially) in the counterbore 27. An annular valve seat insert 33 is positioned on the outside of the valve core 30 to close off the inlet port 13 from the outlet port 15 when the seat insert 33 is matingly engaged with the angled valve seat 22.

The inside diameter portion 30a of the valve core 30 is threadedly engaged with a threaded shaft 43 which is also preferably made from a wear resistant lubricious material 34 such as composite PTFE or similar low-friction, chemically inert material. A pin 36 is retained in the cartridge 24 and engages an axial slot 36a on valve core 30 to prevent rotation of the core when the drive threads 43 are actuated. The valve core 30 has an upper annular surface 35 which engages the shoulder 26a between the bearing-receiving counterbore 26 and the largest counterbqre 27 of the cartridge 24 to stop the upward movement of valve core 30. Pressure balance chamber 62 is sealed from the inlet port 13 by seals 17 and joins the outlet port 15 via a bleed passage 18 which connects the hollow annular bottom portion 31 of valve core 30 to the pressure balance chamber 62.

Referring again to FIG. 1, a brushless D.C. permanent magnet servomotor generally designated 40 is designed to cooperate with the valve generally designated 10. The motor 40 is shown to comprise, beginning from the inside and working toward the outside, a cylindrical rotor 41 in this embodiment having six polar segments which accommodate permanent magnets 42 extend along the vertical sides thereof. Rotor 41 is rotatably mounted between wear resistant lubricious bearing assemblies 59 and 60, which are designed for running wet or dry for extended periods without damage. Referring again to FIGS. 1 and 1A, the rotor 41 has a threaded extension in the form of a shaft 43 which extends from near the bottom end of the rotor 41 through the bores 25, 26 in the cartridge 24, and threadedly engages the valve core 30 as pointed out above. The bushing 59 is preferably made from a lubricous material such as a filled graphite or carbon graphite material affording a lubricous surface and an extended wearing capability. The permanent magnets 42 are retained in the rotor 41 by drawn shell end caps 61.

According to the present invention, a pulse set is used for rotationally positioning the rotor. These pulses are generated by the permanent magnets 42 embedded in the rotor 41 as detected by the Hall-effect sensors 54. The Hall-effect sensors detect the magnetic field surrounding the permanent magnets and switch the field on or off as the magnetic field changes. The present invention utilizes the permanent magnets both as magnetic force generators and as part of the positioning control system.

The rotor 41 is hermetically pressure sealed to the valve body 11 and its internal components by a magnetically transparent stainless steel can 44 that is welded at its top end to a bearing mount 45 and at its bottom end to an annular can flange 47 that is retained on the annular electric motor mounting flange 16 of the valve body 11 by a hold-down flange 46 and bolts 46a. The thickness of the stainless steel can is important to operation of the brushless servo motor 40. Because a thick can requires a longer (therefore weaker) magnetic path to pass there through, and a thin can does not provide the stability needed to rotatably mount the rotor 41 therein, a compromise must be struck. A can having a thickness of 0.015 inches has proved acceptable in at least one case; 0.010 to 0.035 inches seems to be a typical range.

Outside the stainless steel can 44 and mounted on the hold-down flange 46 is a cylindrical housing assembly 50 formed of sheet metal and including a spherical shell end cap 51 welded together and to a removable housing flange 52. The housing assembly 50 is mounted and sealed to the hold-down flange 46 with mounting screws 52a and gaskets. Mounted between the housing assembly and the stainless steel can is an annular stator 48.

The electronic motor drive circuitry shown somewhat diagrammatically in FIG. 1 is mounted on a circuit board generally designated 53 and retained between the bearing mount 45 of the hermetically pressure containing sealed chamber and the housing end cap 51. The electronic circuitry on board generally designated 53 includes sensor wiring extending down to the Hall-effect commutation sensors 54 positioned adjacent but spaced by the thickness of the can 44 from the poles of the magnets 42, and the drive wiring 55 extending from the circuit board 53 to the stator windings 58.

Integrating the driver within the motor envelope reduces the amount of power wiring to be connected by the ultimate user of the valve. Instead of three power wires, there are only two, and all five sensor wires are contained within the valve assembly, thus being eliminated from the user's responsibility. Only two control wires and two power wires are required for motor connection, instead of the eight that are normally required. Control and power wiring from the circuit board extends outwardly of the end cap 51 through a cylindrical conduit 57 specifically designed to hermetically pressure seal the wires using PTFE compression seals 70 and an epoxy resin 71. The housing is cast within with epoxy generally designated 72.

Referring again to FIG. 1, all of the above-enumerated motor components work to turn the rotor 41 inside its hermetically pressure sealed can 44 to turn the threaded shaft 43 on the valve core 30, thus reciprocating the valve member from its closed position to its open position. The valve core 30 may be positioned as desired anyplace between open and fully closed or any intermediate position, as determined by the control commands from the various process sensors.

Figure 6:
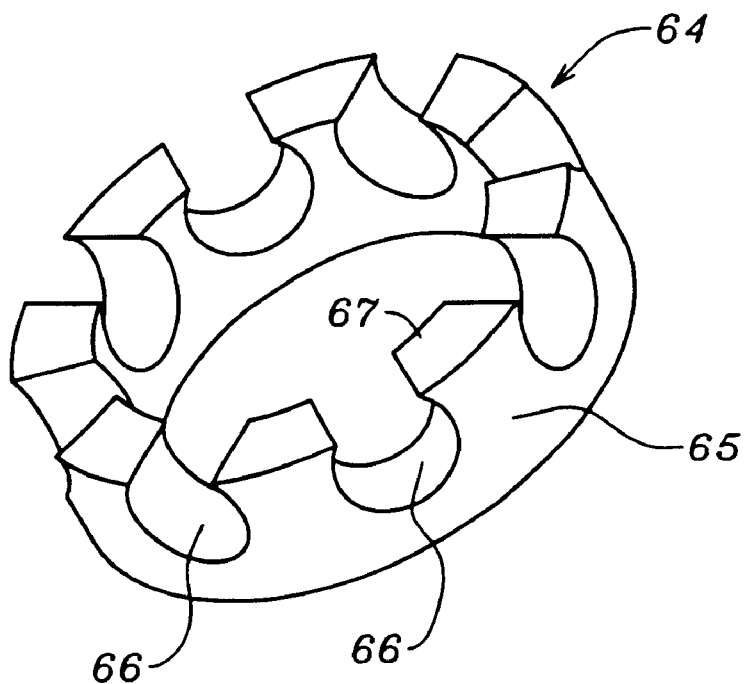
FIG. 6 is a top plan view of an improved bearing assembly designed for running for extended periods whether wet or dry without damage.
Figure 7:
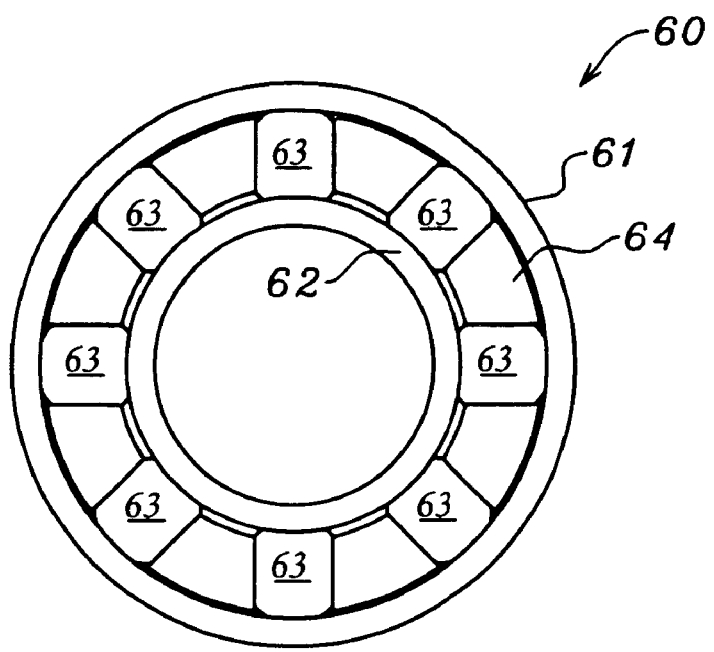
FIG. 7 is a perspective view of a bearing cage for the improved bearing.

Referring again to FIG. 1, but also to FIGS. 6 and 7, an area inside the portion of the rotor housing 44 and the valve body 11 that has been found very important to long life of the sealed motor operated valve is the ball or other roller type bearing 60 retained between the cylindrical cartridge 24 and the rotor drive shaft 43.

Referring now specifically to FIGS. 6 and 7, there is shown a bearing assembly, generally designated 60, that includes an outer race 61 and inner race 62, a plurality of ball bearings 63 positioned therebetween and held in place by a cage member, generally designated at 64. Heretofore, most such cage members are believed to have been made of metal. Others are known to be made from plastics, such as polyimides, which are known to lack broad chemical resistance. In the harsh environment of the valve body 11, most process fluids act as de-greasing agents, especially with slow or limited, intermittent, partial rotation. This minimizes or negates the effect of lubricant between the bearing members, i.e., the outer race and the ball bearings, and the inner race and cage. The cage of the present invention, shown at 64, is made of modified polytetraflourethylene (PTFE) or similar chemically resistant, wear-resistant, low friction material. The cage 64 has an annular base 65 and a plurality of nearly spherical cutouts 66 extending inwardly from an upper interrupted annular surface 67 which is thereby divided into a discrete plurality of trapezoid-like surfaces. Each of the ball bearings 63 fits into one of the cutouts 66 and rotates therein, as the outer race 61 is preferably stationary, and the inner race 62 preferably rotates with the drive shaft 43.

It has been found that, by utilizing the PTFE cage, the cage itself acts as a lubricant on a microscopic or molecular level. As the ball bearings 63 rotate in the pocket 66, a microscopic amount of the PTFE is transferred by sacrificial wear to the outer surface of the ball bearings and acts to lubricate the entire ball bearing assembly 60 in the harsh anti-grease or oil lubricant environment normally found within the valve body 11. Tests have shown that the use of the PTFE cage 64 in the ball bearing assembly 60 has provided a bearing life which is up to 50 times or more longer than the bearing life that is expected when a traditional steel cage member is utilized. This in turn significantly contributes to the long operating life of the sealed D.C. brushless servo motor operated, pressure balanced valve assembly of the present invention. It is further thought that the filled PTFE material is particularly effective in view of the stop-start cycling undergone by the armature when the armature is advanced bit by bit in response to pulses of current supplied by the drive windings. Oil and grease lubricants tend not to be as effective as might be thought in this environment. The other end of the rotor is journaled in a bushing typically comprised of graphite or a filled graphite material.

The Magnetic Circuitry

Referring now to FIG. 1, stator windings 58 are constructed of wire length and diameter optimized for a given peak current and voltage in order to deliver an optimum electromagnetic field to the stator iron 48. Stator iron 48 is in close radial proximity to a rotor system including permanent magnets 42, separated by a magnetically transparent, hermetically pressure sealed can 44. Stator iron 48 is optimized in thickness and geometry to deliver the peak electromagnetic field to the permanent magnets 42 across the larger gap (than a conventional motor) required to accommodate the hermetic can. Permanent magnets 42 are optimized in field strength and thickness to react to the peak electromagnetic field with resultant peak torque forces tending to effect motion to the threaded shaft 43 and valve member 30. The permanent magnets 42 are retained to the rotor 41 with magnetically transparent drawn shell end caps 61.

The Electronic Circuitry

Ideally, a motor operator for a control valve needs to deliver strong linear actuation forces, at a relatively slow rate of speed, with low power consumption, in a compact package, with a high reliability, at a low cost. The slow rate is required so that the valve moves from full closed to full open in a time of 6 to 30 seconds, 15 seconds being typical, although other rates are possible, depending on the valve size and other parameters. For a threaded drive application with no additional gearing, the motor would rotate at about 50 revolutions per minute.

In the present invention, prior art problems have been overcome by utilizing low frequency chopped current pulses of full voltage to drive the motor. The frequency of the chopped current is about 8 Hertz, so hysteresis losses are low. The pulse drive operates the motor at a low duty cycle so as to minimize the average current supplied to the motor, thereby allowing higher currents and torque during the on period. Lower average currents reduce the power dissipated by the motor resulting in a reduced temperature rise in the servo motor. Maximum voltage is delivered to the winding regardless of load, and load changes have very little effect on power input and heat rise. Maximum torque is available to the motor, and motor speed remains low. No feedback controls are required, so effective torque and speed control is attained at very little additional cost.

For the improved drive method, the motorized system inertias and frictions are typical of the applications of motor operated valves. Referring to FIG. 1, power and control wiring 73 are connected to the board 53 to supply all power and control commands to the sealed motor operated valve. Hall-effect sensors 54 are positioned outside the can 44 in close radial proximity to the permanent magnets 42 to sense position of the rotor system 41. Signals generated by the sensors are sent to circuit board 53 which are utilized to determine the appropriate windings to energize to rotate the motor. The circuit board 53 contains motor drive circuitry designed to continually deliver on demand peak current periodic pulses through short motor leads 55 to the appropriate stator windings 58 to effect peak torque from the motor. These peak current pulses are optimized in strength, frequency, and length, to effect a simple and improved means to deliver higher torque and control the speed and heat buildup of the motor actuator under widely varying load conditions.

Figure 9:
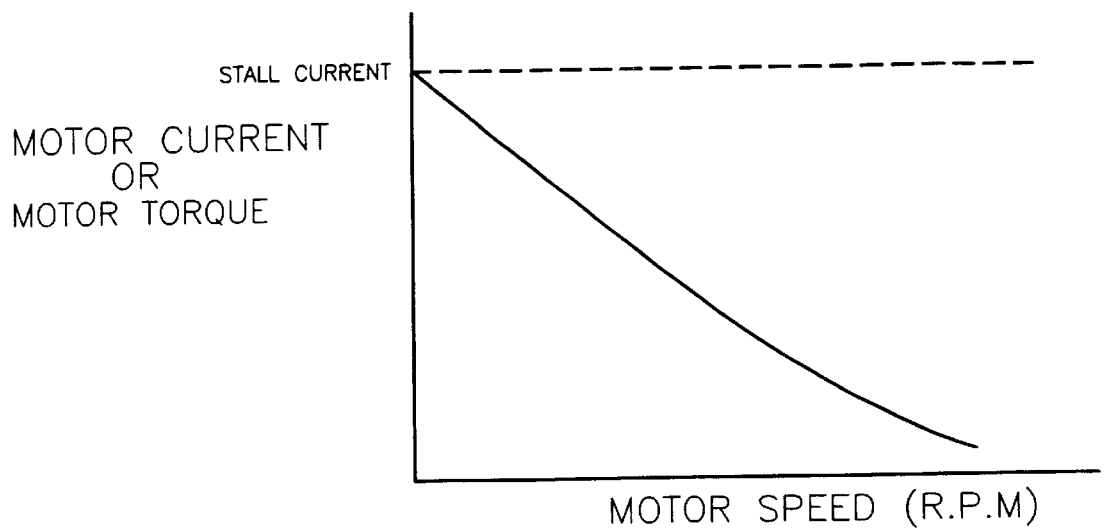
FIG. 9 is a graph illustrating the relationship between motor speed and motor torque for a permanent magnet brushless D.C. motor.

FIG. 9 illustrates the relationship between motor current or torque and speed of a conventional D.C. permanent magnet motor when the motor is driven at a constant voltage. It shows that the highest current and torque possible for a given voltage is when the motor is stalled.

Figure 10:
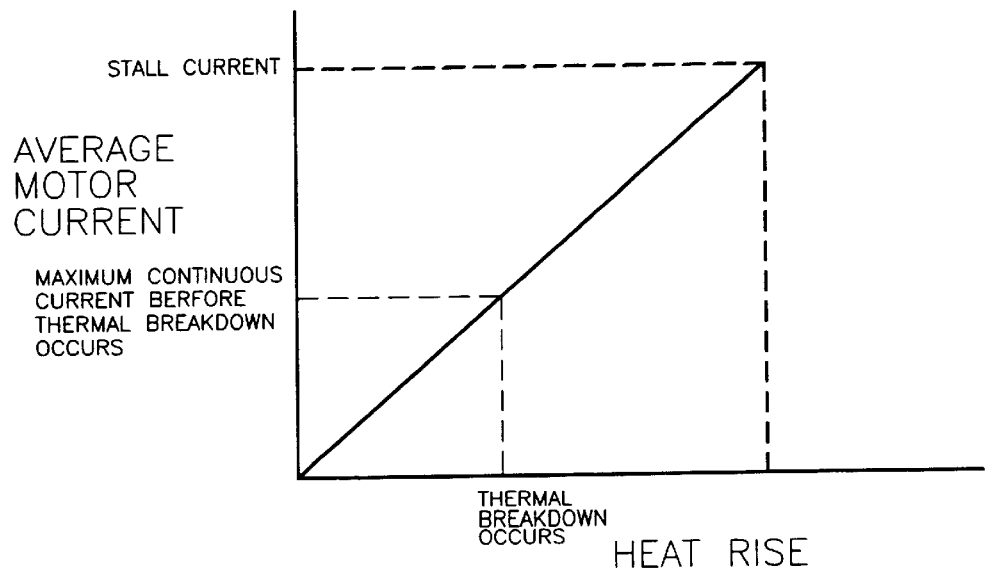
FIG. 10 is a graph illustrating the relationship between motor current and motor heat rise for a permanent magnet brushless D.C. motor utilizing conventional motor drive methods and showing the thermal limit of a conventionally driven motor occurring at a current well below the maximum current.

FIG. 10 illustrates the relationship between average current and heat rise for a fully enclosed motor. It shows that increased motor currents produce an increased heat rise, and that the motor has a thermal limit, beyond which thermal breakdown and motor failure will occur.

Figure 11:
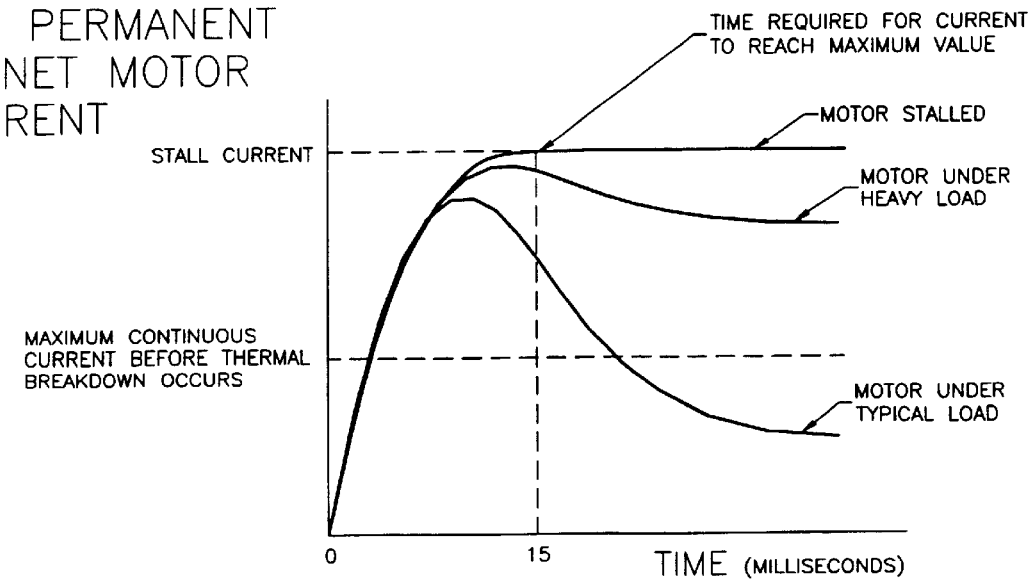
FIG. 11 is a graph illustrating the full voltage motor current versus time while a permanent magnet brushless D.C. motor utilizing conventional motor drive methods is driven under various loads accelerates from a stopped position to running speed.

FIG. 11 illustrates the current verses time for a conventional permanent magnet D.C. motor driven at constant voltage if the motor was allowed to accelerate from a stopped position under various loads. The heaviest load is for a stalled motor where the current reaches a maximum current level in a finite time, a typical value is 15 milliseconds (depending on voltage, inductance, and other factors) and the current remains at that maximum value. The maximum current for the motor subjected to lighter loads is somewhat less, and occurs earlier. As the motor accelerates under these lighter loads, inertial resistance drops and back electromagnetic forces rise, both working to drop the current and torque. As the motor reaches full speed for a given load, the back electromagnetic voltage produced by the motor speed resists and reduces the current input by a function of the motor speed.

Figure 12:
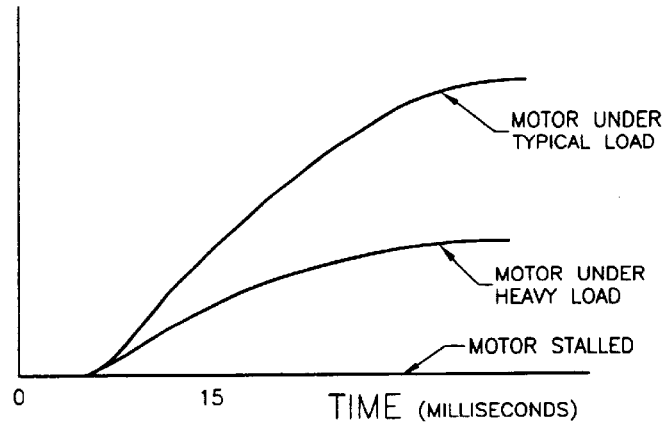
FIG. 12 is a graph embodiment of the present invention illustrating the speed versus time while a permanent magnet brushless D.C. motor utilizing conventional motor drive methods is driven under various loads accelerates from a stopped position to running speed.

FIG. 12 illustrates the speed versus time for a conventional permanent magnet D.C. motor driven at constant voltage if the motor was allowed to accelerate from a stopped position under various loads. The final motor speed is a function of motor load.

Figure 15:
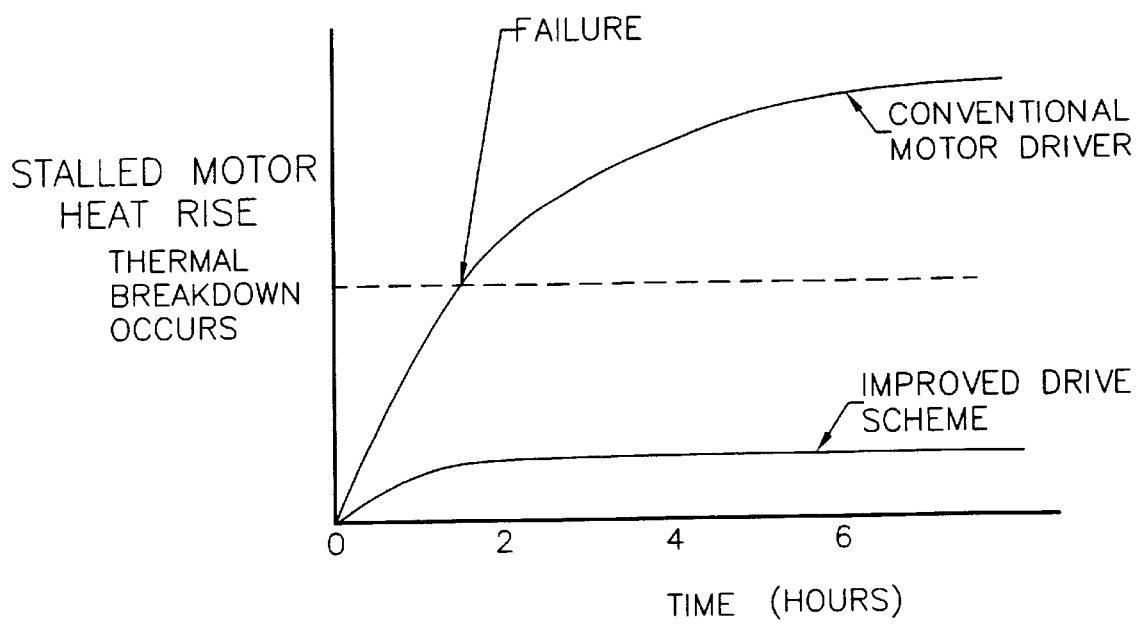
FIG. 15 is a graph illustrating the relationship between motor heat rise versus time for a stalled permanent magnet brushless D.C. motor utilizing conventional motor drive methods and utilizing optimally timed pulses according to an embodiment of the present invention.

FIG. 11 and FIG. 12 illustrate that there are load conditions in which a motor is able to deliver movement under heavy loads, but would not be able to sustain the movement for extended periods without thermal breakdown. They show a limiting factor in conventional motor performance is heat-buildup, not torque. Motors sized only for sufficient torque are usually inadequate for an application due to the probability that the motor will overheat and fail in service. A larger motor would be required if driven conventionally. In an extreme case, as shown in FIG. 15, a motor subjected to stall for extended periods will typically fail within a couple of hours using conventional drive methods.

Heretofore, brushless D.C. motors have not been used for sealed motorized valves partly due to the difficulties in providing slow speed control combined with high torque, without exhibiting thermal runaway or high temperatures. Traditionally, a brushless servomotor driver provides speed control by utilizing a closed loop feedback from Hall-effect sensors and high frequency chopping of the output voltage to the motor. As the motor is started and accelerates to the set speed, the driver chops the full voltage at high frequency effectively to reduce the power to the motor. The method adds cost to the driver and has several disadvantages. Firstly, the frequency of voltage chopping is typically 1,500 Hertz which adds hysteresis losses and heat to the motor. Secondly, during heavy load or stall conditions the motor would overheat as the driver delivered full voltage and current. It is desirable that the motor may be kept running while in a stall condition (such as when the valve is in a closed position), and the heat build up of a motor in such condition using a conventional driver would be intolerable.

A new and improved drive method was developed to utilize maximum motor torque without damaging heat buildup by considering three factors; for a given voltage the current rise time of the stator windings, the rotational inertia of the rotor and driven components, and the back electromagnetic voltage produced by motor velocity. A length of time is chosen based upon these factors where for a given voltage at least enough time for the maximum stalled current would be reached if the motor were stalled, secondarily by no longer a time than necessary for the inertial resistance to drop to a fraction of its initial value and the back electromagnetic force to just become significant if the loads were light. It is important that the armature slows significantly or comes to a stop between cycles. The armature may pass one or two poles if lightly loaded, or less than one pole if heavily loaded, but the armature should come to a virtual stop between each pulse. If a motor is periodically energized for this length of time, individual increments of motion is imparted by the motor producing strong, slow actuation forces which are relatively insensitive to load variations. By applying full voltage to the motor while the armature is stopped, a substantial current is induced, the duration of voltage and current are such that there is a maximum torque production impulse, but little current "wasted" during a period when motor torque would accelerate the load to an undesirable speed when loads are light. In addition, the periodic torque impulses are strong enough to move heavy loads at an acceptable rate, without undesirable heat buildup.

Using common electronic control methods, on demand the motor is periodically energized only for a short length of time, and allowed to idle for a great length of time, with the period repeating as long as demand requires. The average speed and motor heating factor is predetermined by the length of said idle time. Typical ratio of energized length of time to total length of time of said period is 5 to 25 percent.

Figure 13:
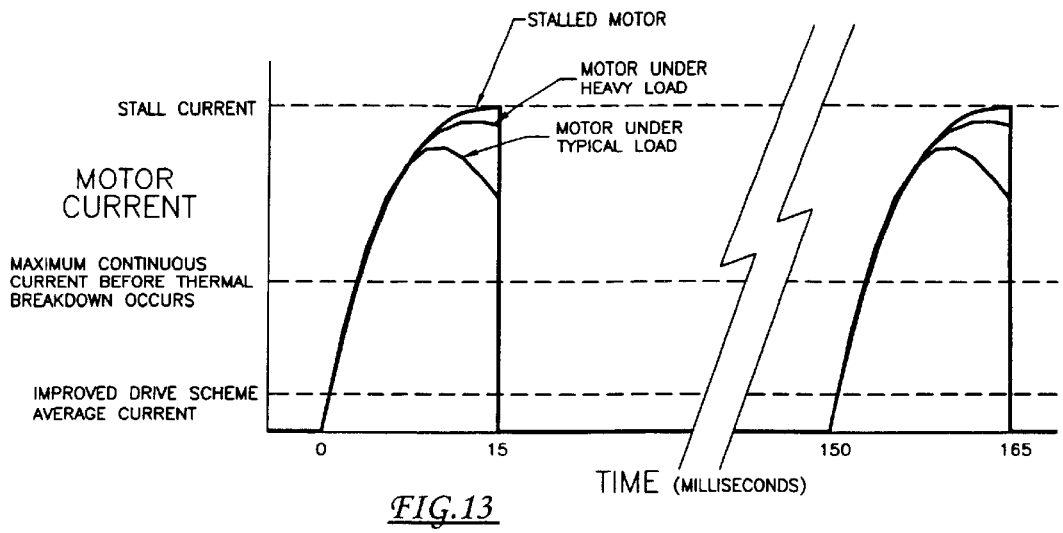
FIG. 13 is a graph illustrating the motor current versus time while a permanent magnet brushless D.C. motor is subjected under various loads to full voltage for optimally timed pulses according to an embodiment of the present invention.
Figure 14:
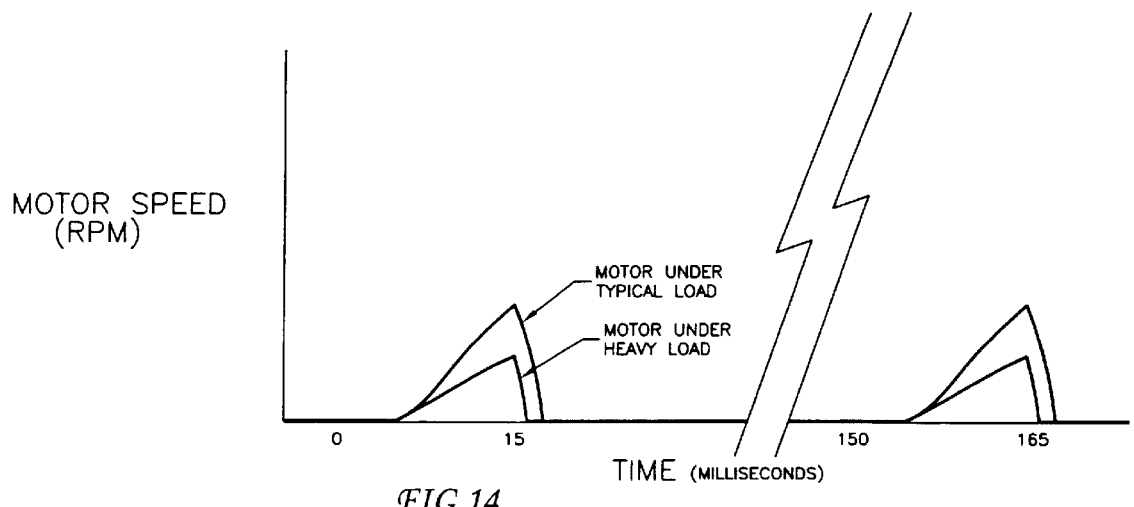
FIG. 14 is a graph illustrating the motor speed versus time while a permanent magnet brushless D.C. motor is subjected under various loads to full voltage for optimally timed pulses according to an embodiment of the present invention.

FIG. 13 illustrates the current of the motor under various loads verses time for the improved drive method. The windings are energized with current at a given full voltage for the aforementioned energized time, then said current is removed for remainder of such period, and said period is repeated indefinitely until motion forces are no longer demanded. FIG. 14 illustrates the speed of the motor under various loads verses time for the improved drive method.

Using only the first portion of the speed/time characteristics of the motor accelerating from a stopped position has an attenuating effect on the speed versus load of the motor operator. During the first few milliseconds, the fixed inertial load is a significant fraction of the total (fixed inertial plus variable) load of the system. After six or seven milliseconds, the inertial resistance is overcome and loads become significant. After about 15 milliseconds, the back emf has risen, and the current is cut, and the rotation of the armature, as a practical matter, essentially ceases. Although the windings could be supplied with a tiny or "trickle" current between pulses, and although the armature could virtually although not literally come to a stop, practice of the invention calls for cutting off all or by far the majority of the current energizing pulses, and stopping or virtually stopping the armature between pulses.

FIG. 15 shows that although a prior art motor may be able to deliver enough torque to actuate a load, thermal breakdown will occur if the motor is loaded heavily for extended periods. Utilizing the improved drive method allows the motor to be loaded heavily without creating thermal problems; average current and heat buildup are well below limit values. The lower curve on FIG. 15 shows the low average current of the motor using the improved drive method. FIG. 13 shows that power supplied to the motor is much more constant than using conventional driver methods and heat rise is small and nearly constant and substantially independent of load. The inherently small and limited power required make the motor and driver such that other suitable for low power alternative energy sources may be used. Examples of such power sources are batteries, solar power, wind-driven generators, etc. Performance is improved under all load conditions and thermal protection is inherent in the design. In summary, a new and improved method of obtaining strong, slow movement of valve members has been achieved.

Figure 2:
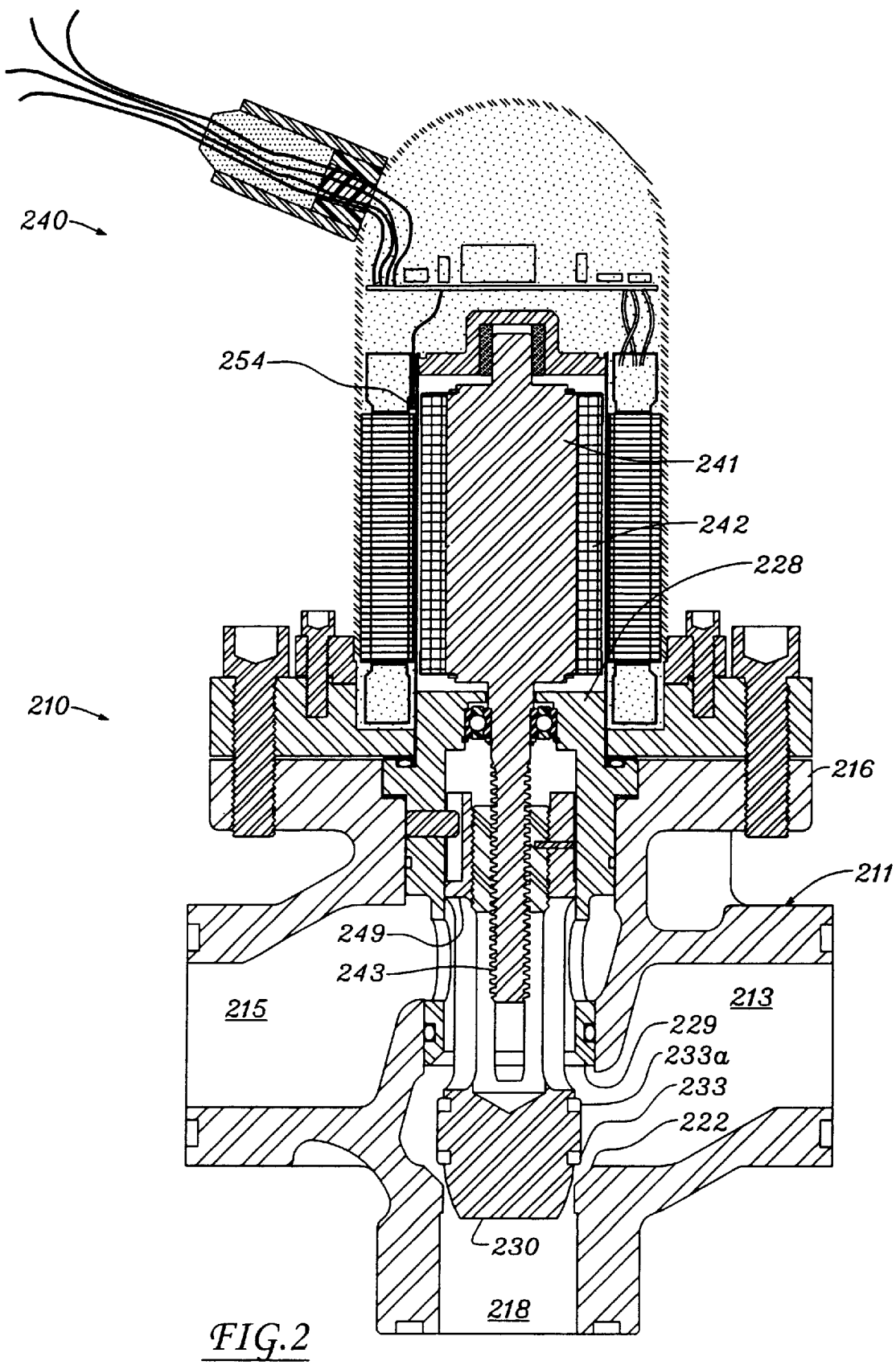
FIG. 2 is a vertical sectional view, with portions broken away, of a sealed motor-operated three-way valve according to an alternate embodiment of the present invention.

Referring now in detail to FIG. 2, there is shown another embodiment of a sealed, motor driven valve assembly generally designated 210, made according to the present invention. If flow occurs from the right as shown in the drawings, the valve is a diverting valve. If flow is to the right, it is a mixing valve. The valve 210 includes a valve body generally designated 211 which is of a flow-through design and is similar in most or all respects to the valve shown in FIG. 1, except that instead of the two-way valve body, it is a three-way valve body. Further, the valve core 230 has a pair of annular valve seat inserts 233 and 233a surrounding the core 230, and the core has two segments 230 and 249. Hence, the threaded shaft 243 extends down inside the valve core 230 and the valve core upper segment 249.

Referring again to FIG. 2, the housing 211 includes an inlet bore 213, and two outlet bores, namely bore 215 and bore 218. The body 211 also includes, an addition to the lower angled valve seat 222, an annular valve seat 229 formed on the lowermost margin of the cylindrical cartridge 228. The valve body motor mounting flange 216, the motor 240, including the rotor 241, the permanent magnets 242, the Hall-effect sensors 254 are the same as their counterparts in FIG. 1.

In use, the valve core moves between seats 229 and 222, allowing a varying amount of flow to pass out passage 215. When there is no flow in passage 215, the entire contents of the passage 213 passes into the passage 218. When the valve core is in the extreme other position, the fluid passes through passage 215, In any other position of the valve core 230, neither seat insert 233, 233a engages the seat 230, 222 and a portion of the fluid flow passing into each outlet is in a controlled progressive ratio depending on the exact position of the valve core 230.

Figure 3:
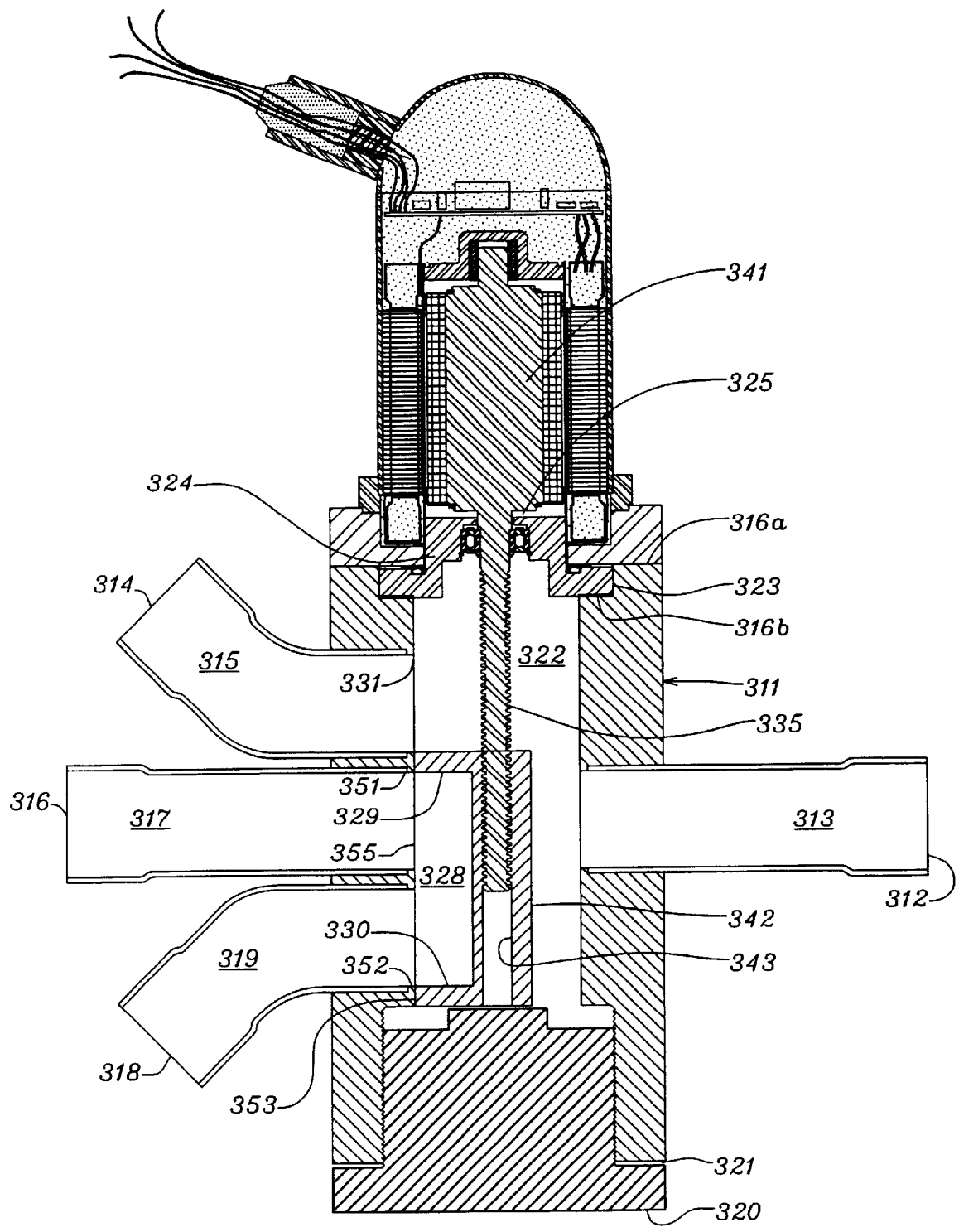
FIG. 3 is a vertical sectional view of a sealed motor-operated four-way slide valve according to a further embodiment of the present invention.

Referring now to FIG. 3, a sealed, motor-driven four-way valve generally designated 310 and typically used for seasonal changes in an air conditioning compressor/evaporator environment is shown. The valve body generally designated 311 is a typical four-way valve body which includes a flow through design with an annular compressor discharge connection 312, and a compressor discharge port 313 which extends centrally into a rectangular common slide chamber 322. On the opposite side of the valve body 311 is an annular evaporator connection 314 leading to an evaporator port 315, an annular suction connection 316 leading to a suction port 317, an annular condenser connection 318 leading to a condenser port 319. Each of the ports 315, 317, 319 extends inwardly through the valve body 311 into the rectangular common slide chamber 322.

On the lower side of the valve body 311 is a cylindrical plug 320 which is threadedly engaged with the valve body 311 and hermetically sealed with a suitable gasket somewhat schematically shown at 321.

On the upwardly extending side of the valve body 311 is an annular electric motor mounting face 316a, with a counterbore 323 extending downwardly therefrom and terminating in a shoulder 316b. Beneath the shoulder 316b is the slide chamber 322. The end face of the counterbore accommodates a cartridge 324 which carries bearings 325, which in turn journal the end portion of a rotary threaded shaft 335. The threaded or screw shaft is driven by an armature 341, and the other components of the motor 340 are constructed exactly as are their counterparts in FIGS. 1 and 2, for example.

The threaded shaft 335 extends down into the valve core 342 which is made from a hard but lubricous material such as a filled PTFE material or the like. The valve core 342 includes a threaded bore 343 to accommodate the threaded shaft 335. The core 342 of the valve thus moves vertically in the slide chamber 322 between positions to register the transfer passage 328 in the body with the ports 317, 319. As the shaft 335 rotates and the core 342 moves upwardly, it finally stops in position where its upper face 329 is aligned with the top face 331 of the port 315, and the bottom surface 330 is in registry with the bottom surface 332 of the port 317.

At this point, the ports 315 and 317 are in communication with each other and the ports 319 and 313 communicate with each other. The valve core 342 is sealed in a fluid-tight relation within the body 311 on its sides (not shown) and the end faces (to the left in FIG. 3) of the valve core 351, 353, 355 are lapped in such a manner that even a very slight pressure in port 313 urges them in fluid-or gas-tight relation against the seats formed by the inlets/outlets of ports 315, 317, 319. Inasmuch as the valve core moves only seasonally, perhaps two or at most four, six or eight times per year, the incidental cross-flow of fluids during the time the valve core is moving is not of particular importance.

Figure 4:
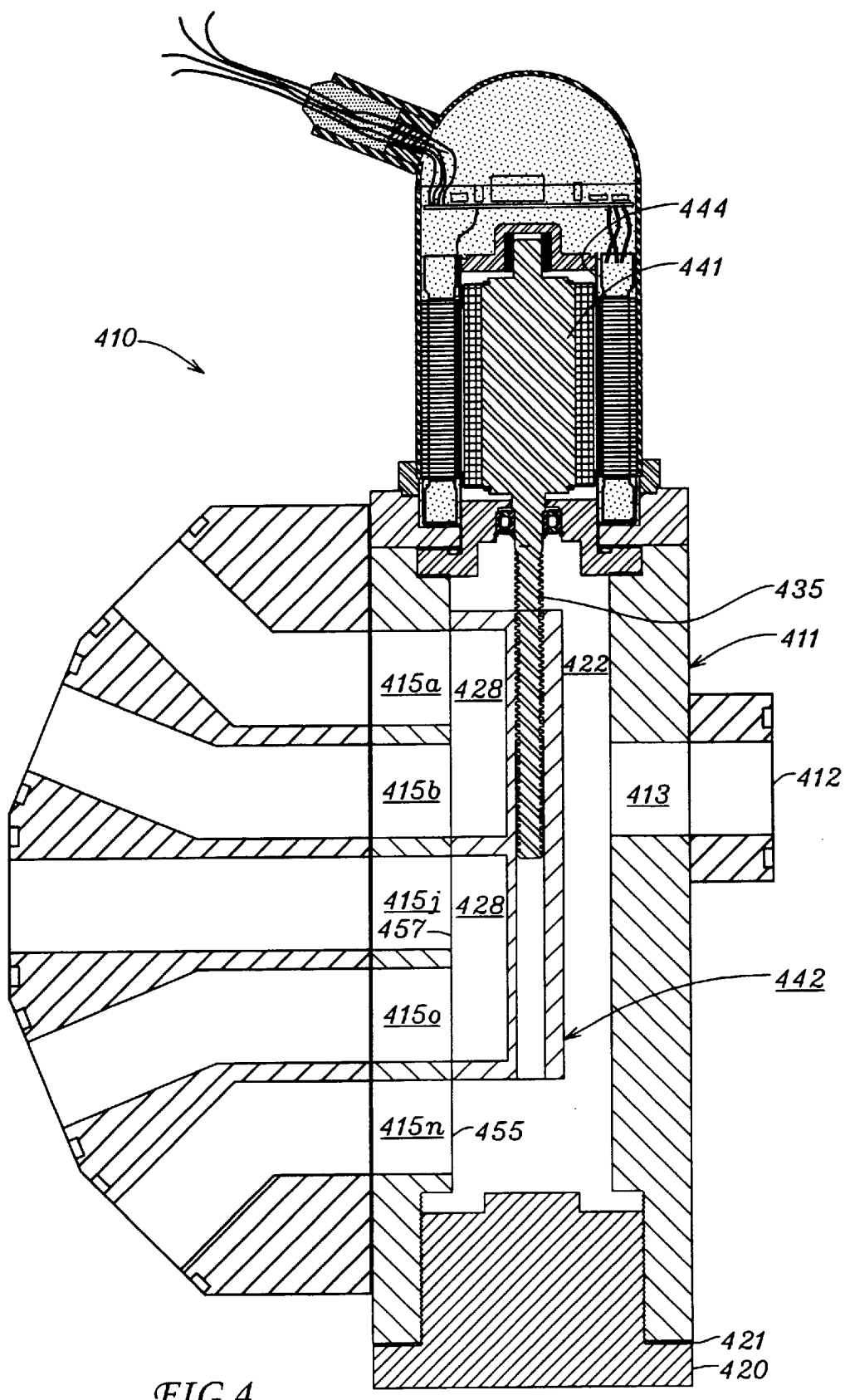
FIG. 4 is a vertical sectional view of a sealed motor-operated multi-port slide valve according to a still further embodiment of the present invention.

Referring now to FIG. 4, a motor-driven valve 410 which is very similar to the valve 310 shown in FIG. 3 is depicted. The main difference between these valves is that there are two common transfer passages 428 in the valve core 442, and a correspondingly larger number of inlet and outlet ports. Thus, for example, the body 411 of the valve 410 contains a compressor discharge line 412 terminating in a port 413 which enters the interior of a slide chamber 422. The chamber 422 is blocked off at its bottom end by a plug 420 and a suitable seal 421 which, together with the hermetic seal around the armature enclosure 444, keeps the entire mechanism within the can and the valve hermetically sealed.

The slide chamber 422 within the valve body 411 is machined so that the valve core 442, which is preferably made from a filled PTFE or like material will readily slide up and down therein, yet seal snugly on its end face surface. In this position, the compressor discharge port 413 is in registry with the bottom port 415n. Also, the two ports 415j and 415o are in registry with each other, as are ports 415a and 415b. The threaded shaft 435 is attached to and driven by the armature 441. When the valve core 442 is moved, in this case, downwardly, by rotation of the threaded shaft 435, the port 415a becomes aligned with the compressor discharge port 413, port 415b and port 415j are registered, and port 415o is engaged with port 415n. The end faces 455 of the body 411 surrounding the ports and the end faces 457 on the ports themselves are lapped and arranged in such a way that the even slight compressor discharge pressure emanating from port 413 will deflect the core enough to ensure that a pressure-tight seal against the ports with which they mate will be created.

The motor operates in the same way as is the other embodiments, and, like the embodiment of FIG. 3, customarily moves the valve core 442 to one of two positions.

Figure 5:
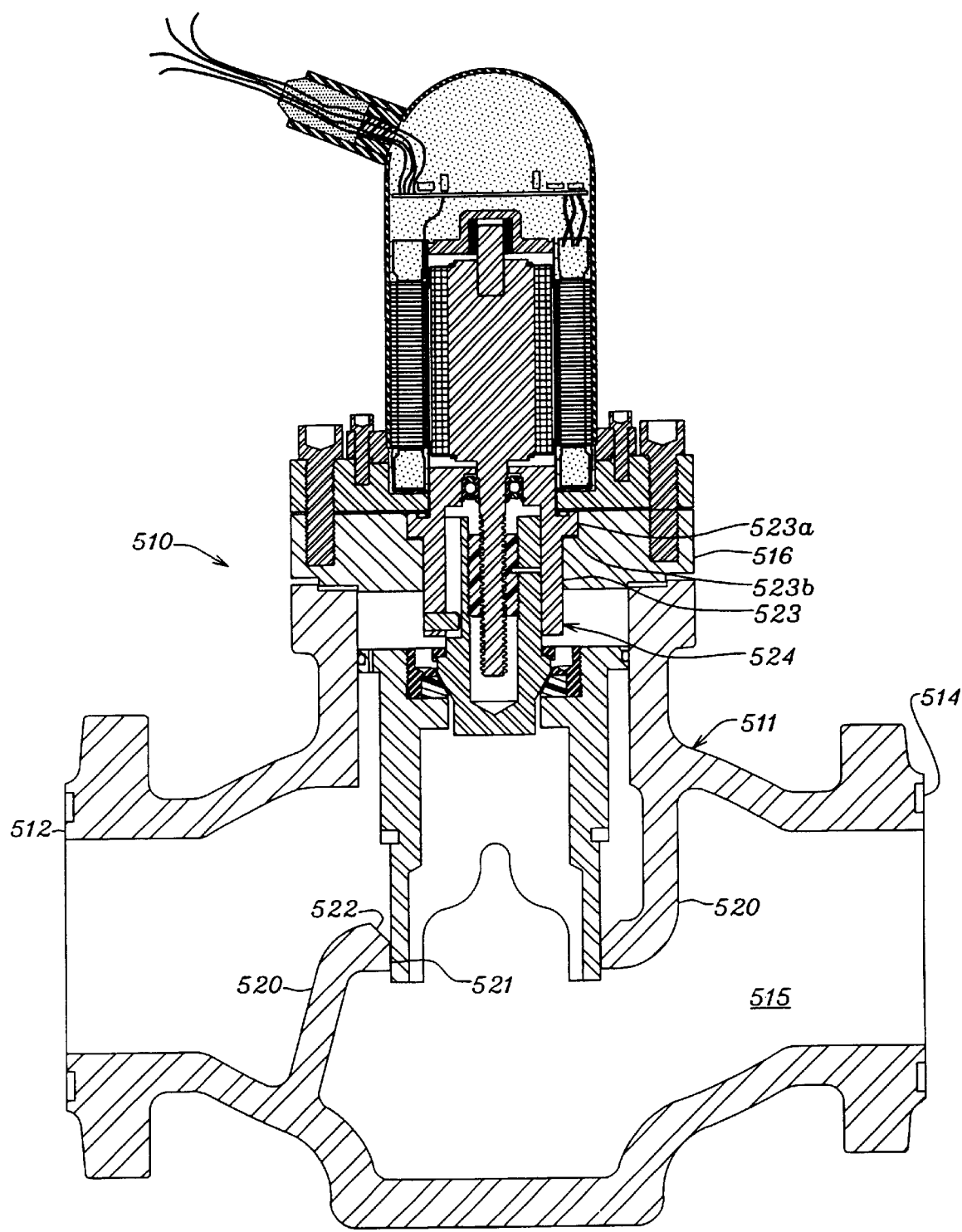
FIG. 5 is a vertical sectional view of a sealed motor-operated, pilot pressure assisted valve according to another embodiment of the present invention.
Figure 5A:
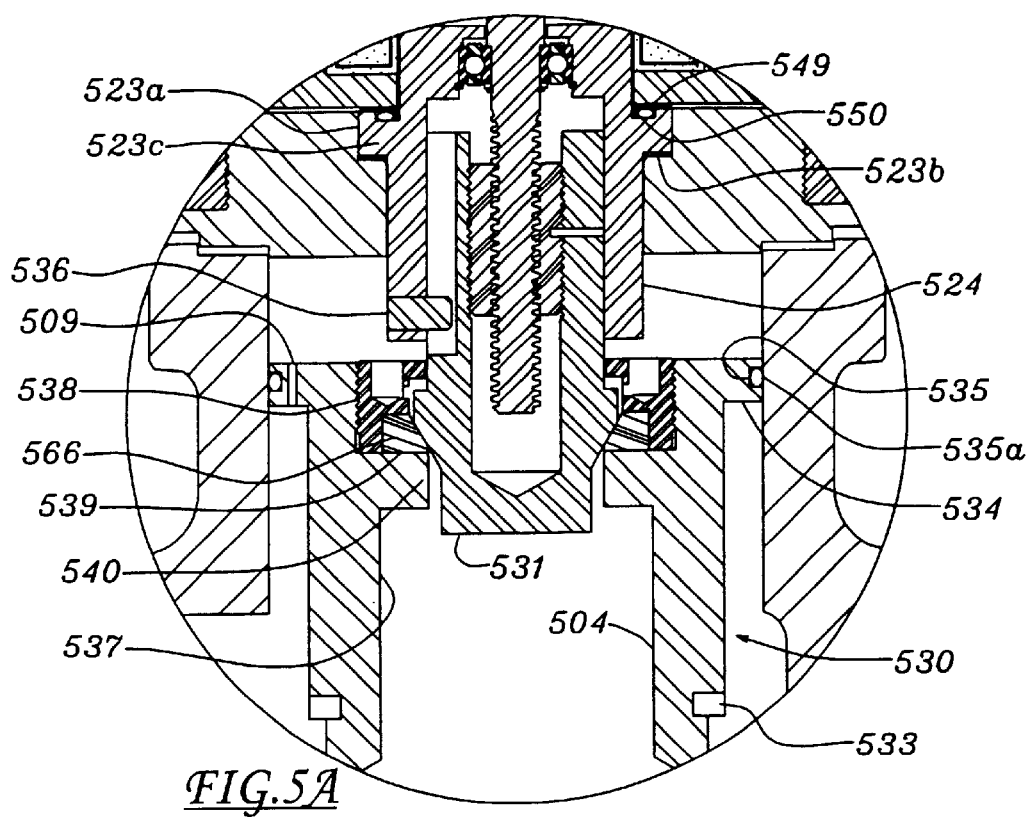
FIG. 5A is an enlarged sectional view of the pilot-assisted valve of FIG. 5, showing the same in one position of use.
Figure 5B:
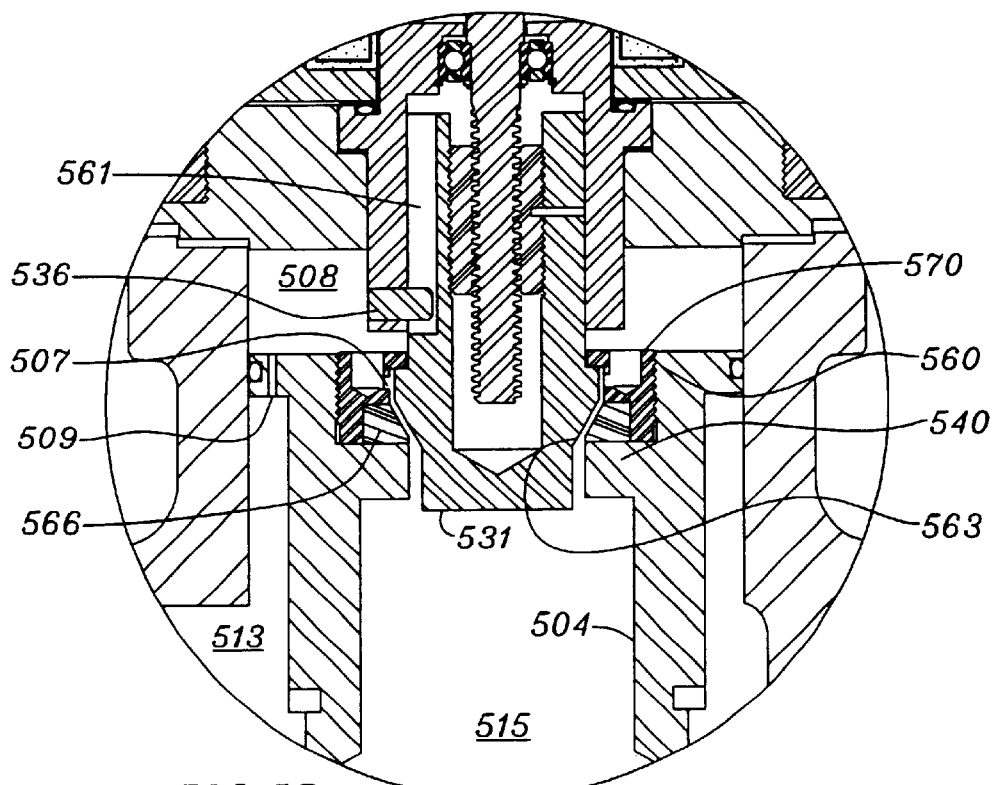
FIG. 5B is a view similar to view FIG. 5A, but showing the pilot-assisted valve in another position of use.

Referring now generally to FIGS. 5, 5A and 5B, a pilot pressure assisted, sealed motor operated valve is used for the control of flow of larger port areas or higher pressure fluids, all using relatively smaller motors. A valve generally designated 510 is shown to be constructed in accordance with the present invention. It includes a valve body 511 which is of a flow-through design having an annular inlet flange 512 with an inlet port 513 extending centrally thereof into and partially across the valve body 511. On the opposing side of valve body 511 is an annular outlet flange 514 and an outlet port 515 extending inwardly partially through the valve body therefrom.

In the center portion of the valve body 511 is an S-shape dividing wall 520 separating the inlet port 513 from the outlet port 515. In the center of dividing wall 520 is a circular valve seat bore 521 which extends through the dividing wall 520 and has adjacent its upper edge a beveled valve seat 522.

An annular electric motor mounting flange 516 mounted to the top of the valve body 511 includes a short central counterbore 523a extending vertically inwardly thereof and terminating in a shoulder 523b and a principal bore 523 lying therebelow for reception of a cartridge 524. Referring particularly to FIG. 5A, the cartridge generally designated 524 is hollow and is mounted on the shoulder 523b; it has an anti-rotation pin 536 extending therethrough and a shoulder portion 523c which seats on a gasket in the counterbore 523a. A gasket 549 lies in a groove 550 in the cartridge and forms a hermetic pressure seal for the can which lies on top of the cartridge 524.

The valve core 530 in this case comprises two principal members, an upper pilot unit generally designated 531 and a lower valve core generally designated 504. The lower core 504 includes a valve seat ring 533, an exterior shoulder 534, a seal groove 535 with a seal 535a and a pressure passage 509 in the shoulder 534.

The inside of the core 509 includes a second shoulder 540, below which is an interior wall 537 and above which is a threaded counterbore 538 and a seating surface 539 for the actual seat insert 566.

Referring particularly to FIG. 5B, the pilot unit generally designated 531 includes a partially threaded bore 560, a groove 561 in which a pin 536 slides and a taper 563 lying between the lower portion 564 (which fits loosely into the second shoulder 540) and the upper shoulder 565. The taper 563 mates with a PTFE seal ring 566 when the pilot is in its lowermost position. The two units 531, 504 have a small amount of lost motion between them, as the threaded ring 570 locks the core and the pilot unit together but permits a slight sliding motion between pilot unit 531 and valve core 504.

A flow passage 507 extends through the valve core 504 and connects the pressure assist chamber 508 to the hollow annular bottom portion of the valve core 504. The small axial displacement of valve core 504 relative to the pilot member 530 allows the conical seating surface 563 to matingly engage with annular seat insert 566. This displacement opens or closes flow passage 507. Pressure assist chamber 508 is joined to the inlet port 513 via bleed passage 509, and is joined to the outlet port 515 via flow passage 507 and bottom hollow portion of valve member 504. Opening or closing the flow passage 507 therefore effects changes in pressure in the pressure assist chamber 508 which imparts forces on valve member 504 in the same direction of effort that the pilot member 531 exerts as a result of motorized actuation, thus allowing much larger valves and flow pressures to be effectively controlled by comparatively smaller motors. In normal use, with high pressure in the inlet 513, the pilot unit 531 and the valve core 504 "float" relative to each other, and there is no net force tending to move the core 504. However, if the pilot unit is moved, the core 504 follows the pilot, under the influence of fluid pressure.

Figure 8:
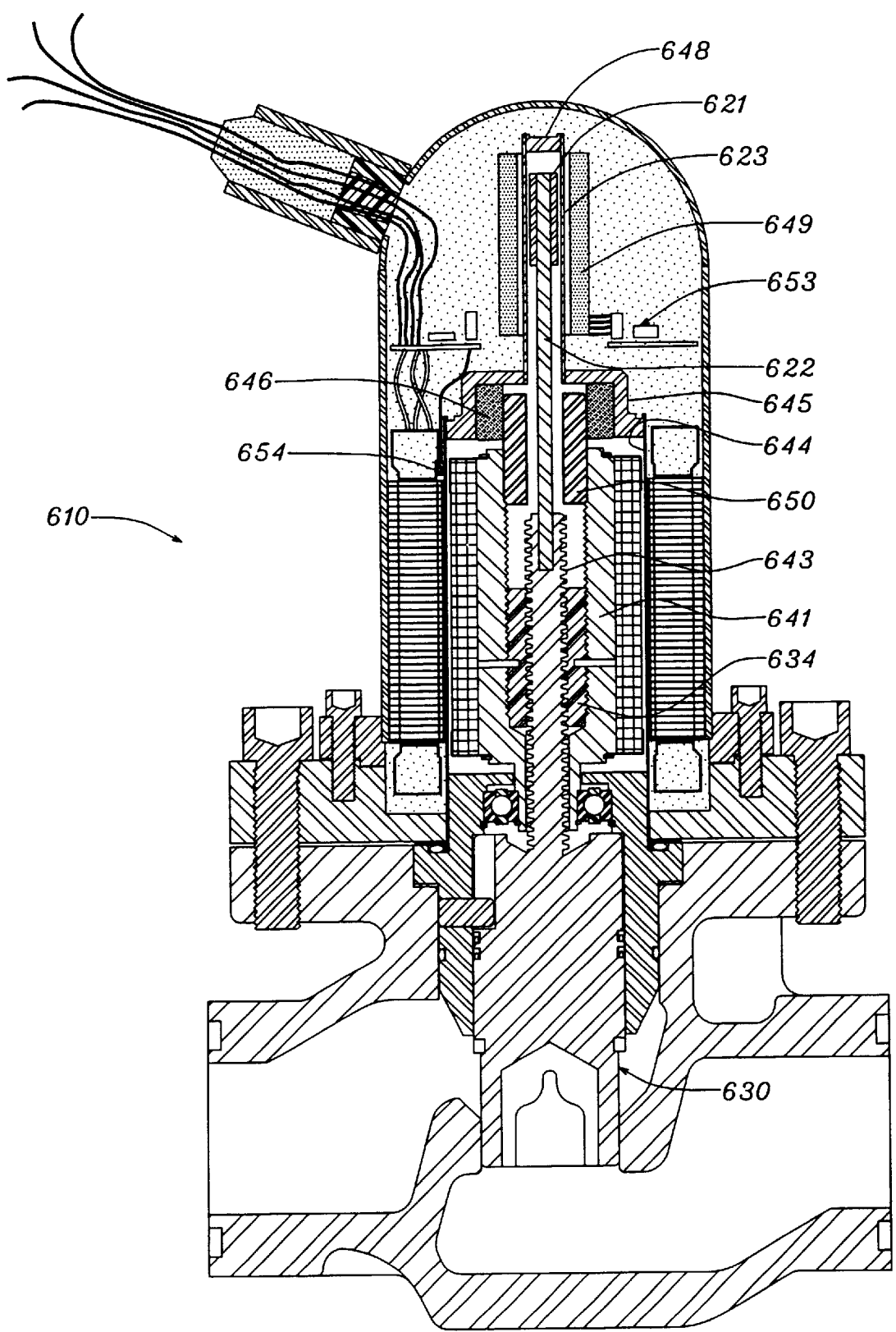
FIG. 8 is a vertical sectional view of a sealed motor operated valve, including an integral valve member position feedback control according to a still further embodiment of the present invention.

Referring now to FIG. 8, there is shown a motor-driven valve using positional feedback to control the exact setting of the valve. The valve member generally designated 630 has its position sensed, and action, if necessary taken, by a unique control system which will not be described. The valve itself 610, including the core 630 is similar to its counterpart in the other examples. The valve core 630 and the threaded shaft 643 of which it is a part, move up and down in response to rotation of the armature or rotor 641. A threaded nut 634, made from a composite PTFE or similar low friction material in this embodiment, is fastened to the armature drive by at least one pin. Accordingly, rotation of the armature drives the shaft up and down. The embodiment of FIG. 8 also differs in detail in several other aspects. Atop the threaded shaft 643 is an extension 622, and this extension is fastened, in this embodiment, to a ferrous armature 621. The armature 621 stays within an upper cylindrical portion 623 of the can 644, and is held there by a cap 645 which has a hollow center and serves as a mount for a bushing 646. The uppermost end of the can extension 623 is sealed by a cap 648. Accordingly, the can comprises an enlarged sidewall portion 644, a cap 645 with an open center, a cap extension 623 and a topmost cap 648. These enclose the ferrous armature as well as the extension and the shaft 643. The ferrous armature 621 moves up and down within the magnetically transparent can extension 623, where its position is sensed by an LVDT (linear variable differential transformer) 649 or other means. An insert 650 has a hollow center portion and is pressed within the armature 641 after the threaded nut 634 is screwed into place and locked by the pins 651. The upper part of the insert 650 is retained by the bushing 646 which is preferably made from an impregnated carbon material pressed into the open center cap 645.

The electronic circuitry used to drive the motor while sensing the position of the valve member 630 is similar to the basic motor drive but also includes circuitry to energize the sensors, receive the position feedback signal and respond to the positional information. While the basic drive circuitry without the valve member position feedback has wiring inputs consisting of two power inputs and two move command inputs (floating control), the enhanced control driver with the feedback positioning contains wiring inputs typically consisting of two power inputs and a two wire 4–20 milliamp input. The circuitry is designed such that it drives the valve closed until the feedback confirmed closure for a 4 milliamp input signal. It drives the valve open until the feedback confirms the valve was open for a 20 milliamp signal and drives and holds the valve at any position in between corresponding to the milliamp signal sent to the driver. Improved control of the process fluids can be realized in some conditions using this type of member positioning feedback. Other displacement sensors may be utilized instead of an LVDT, but they nevertheless feed position information directly to the drive circuitry. The signals from these devices are non-volatile and do not require resetting after a power failure.

If proximity type sensors are used, they serve as multiple home positions for on-the-fly resetting of a counting circuit utilizing the existing commutation Hall-effect devices 654. Hall-effect devices are located near the magnetic gap between the rotor 641 and the stator, and there provide high resolution position sensing of the valve member. This is done by counting the pulses in the order in which they are sent from the sensors 654 to determine distance and direction of travel.

The multiple home positions of the proximity switches provides a non-volatile position information to the counting registers in the drive circuitry 653 so that in the event of a power failure, the registers can be accurately reset while allowing only a small and short-lived error until one of the home positions has been tripped.

Figure 16:
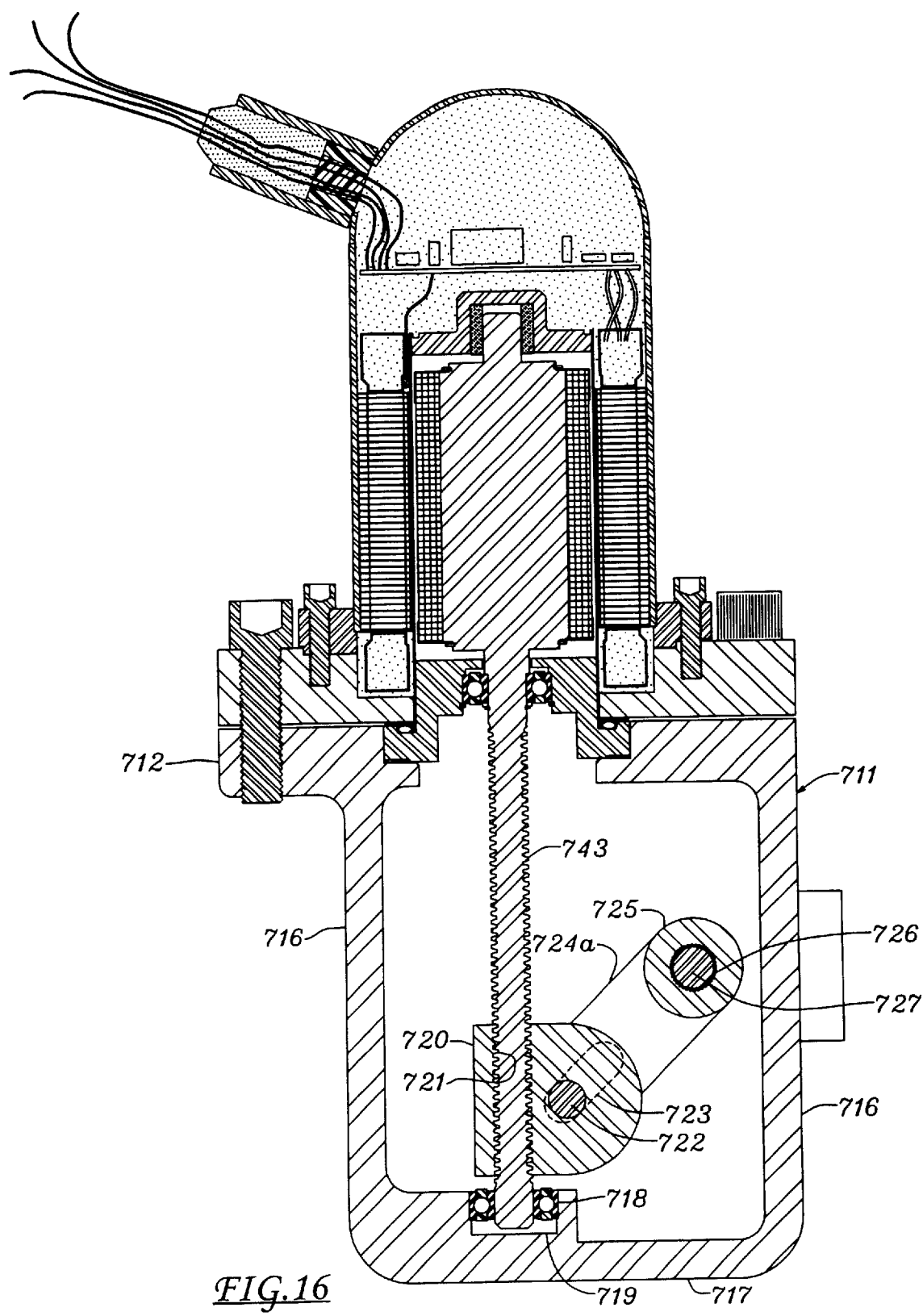
FIG. 16 is a vertical sectional view of a further embodiment of a motorized valve of the invention, showing the drive unit adapted to turn a socalled quarter turn valve from an open to a shut position.
Figure 17:
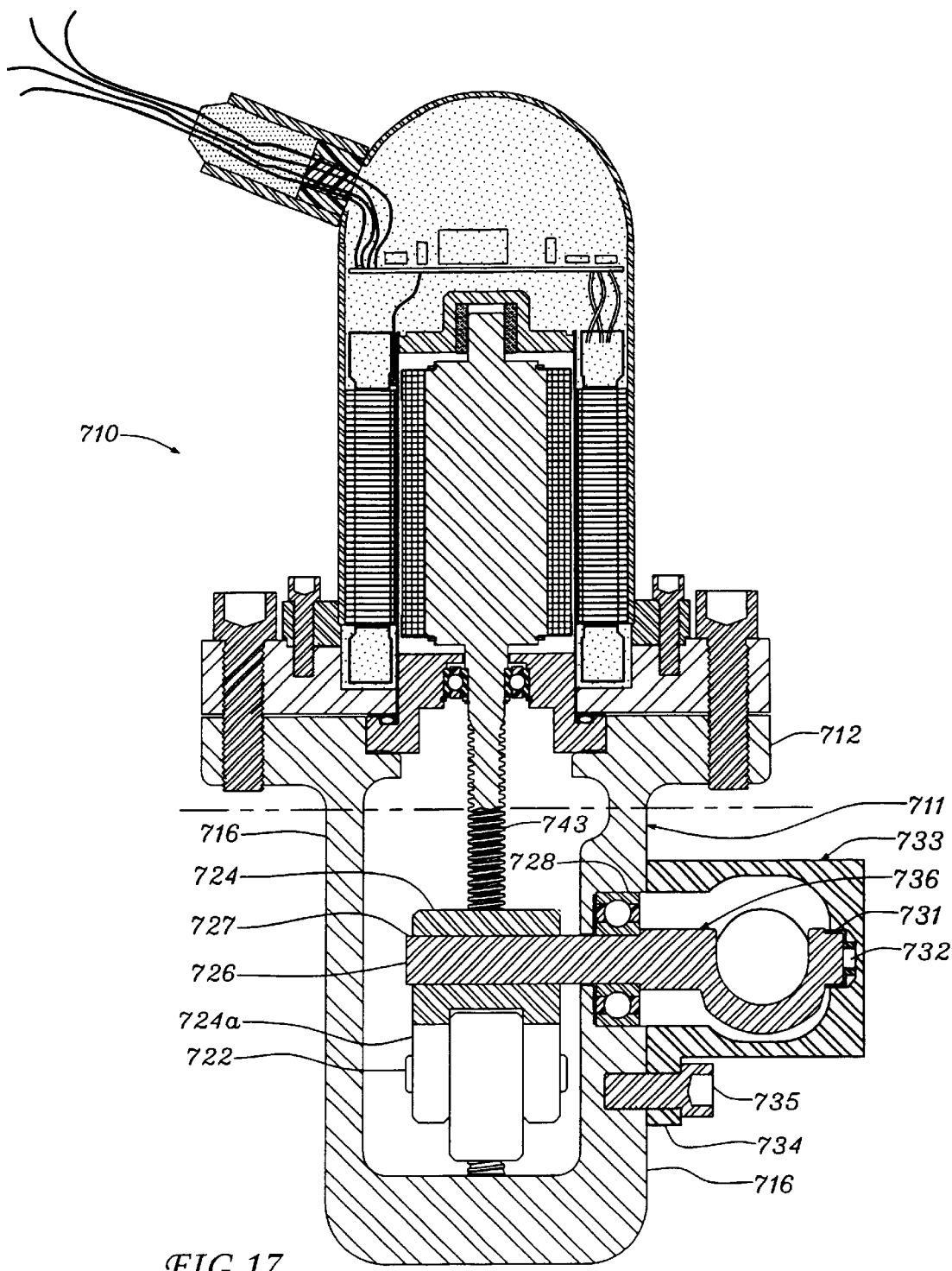
FIG. 17 is a vertical sectional view of the apparatus of FIG. 16, showing a view of the operative mechanism in end section and showing another view of the manner in which the valve opens and closes.

Referring now to FIGS. 16 and 17, there are shown two views of a related but different motor driven valve embodying the present invention. In FIGS. 16–17, the aspects of the motor driven valve generally designated 710 is similar to its counterpart in FIGS. 1–5, for example, and particularly, the section involving the motor is or can be identical with its counterpart in the earlier figures.

In the embodiment of FIGS. 16 and 17, however, the valve body 711 is considerably different. For example, the valve housing 711 includes a horizontally extending flange 712 which includes the top portion 713 of the cartridge which carries the bearings 715. The lower portion of the housing 711 comprises a vertically extending portion 716, a bottom wall portion 717, a bearing retainer 718 formed in a recess 719 in the bottom wall of the housing 711. A rotary shaft 743, which again is preferably manufactured from a filled PTFE material for lubricity, engages a sliding flattened nut 720 having a threaded interior 721. The nut 720 includes a pin 722 therein which engages an elongated slot 723 formed in each arm 724a of the yoke 724. An enlarged head portion 725 of the yoke surrounds the stem 726 of a segmented ball valve core 736. The opening 727 for the shaft 726 is sized so that there is no relative rotation between the two. This may be accomplished by pinning, splining, or other expedient.

Referring particularly to FIG. 17, the stem 726 is supported by bearings 728 and the end of the rotary stem bushing 731 formed in the recess 732 of the valve housing 733. The housing 733 may be attached by a flange 734 and plural socket head cap screws 735 to one of the wall 716 of the housing. The segmented ball valve 736 is driven in such a manner that rotation of the stem 726 serves to move the valve core between open and closed positions.

Figure 18:
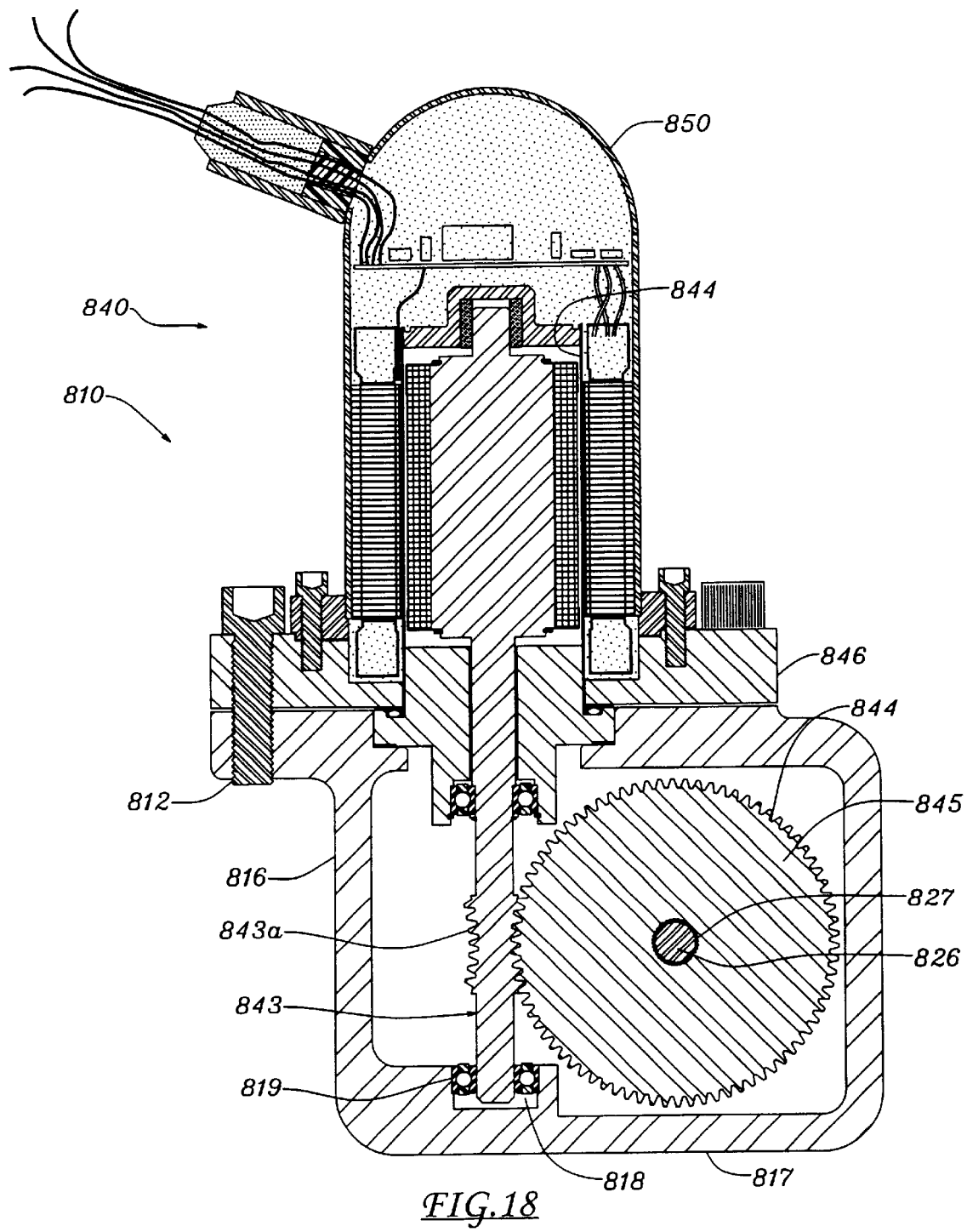
FIG. 18 is a vertical sectional view of a worm and roller gear used to operate another form of quarter turn valve.

Another application of the motor driving a quarter turn valve is shown in FIG. 18. Here, the motor driven assembly 810 including the motor itself 840 the protective cover 850, and the interior can 844 are identical to their other counterparts, as are the remaining portions of the valve at or above the hold-down member 846.

The lower portion of the valve housing includes an opening 812 for fasteners 813, a housing having sidewalls 816 and a bottom wall 817 with a recess 818 therein which includes a ball bearing set 819 for journaling the lower end of a rotary shaft 843. The rotary shaft 843 is threaded as at 843a, and engages the teeth 844 on the wheel 845 which is secured, as at its inner diameter 827 to the stem 826. According to this configuration, the valve stem 826 is rotated and a considerable mechanical advantage accrues between the threaded shaft 843 and the stem 826. Accordingly, this unit is adapted in some embodiments to have a greater mechanical advantage, and thus turn a larger diameter valve than would be the case with the counterpart valves shown for example in FIGS. 1 and 2.

Figure 19:
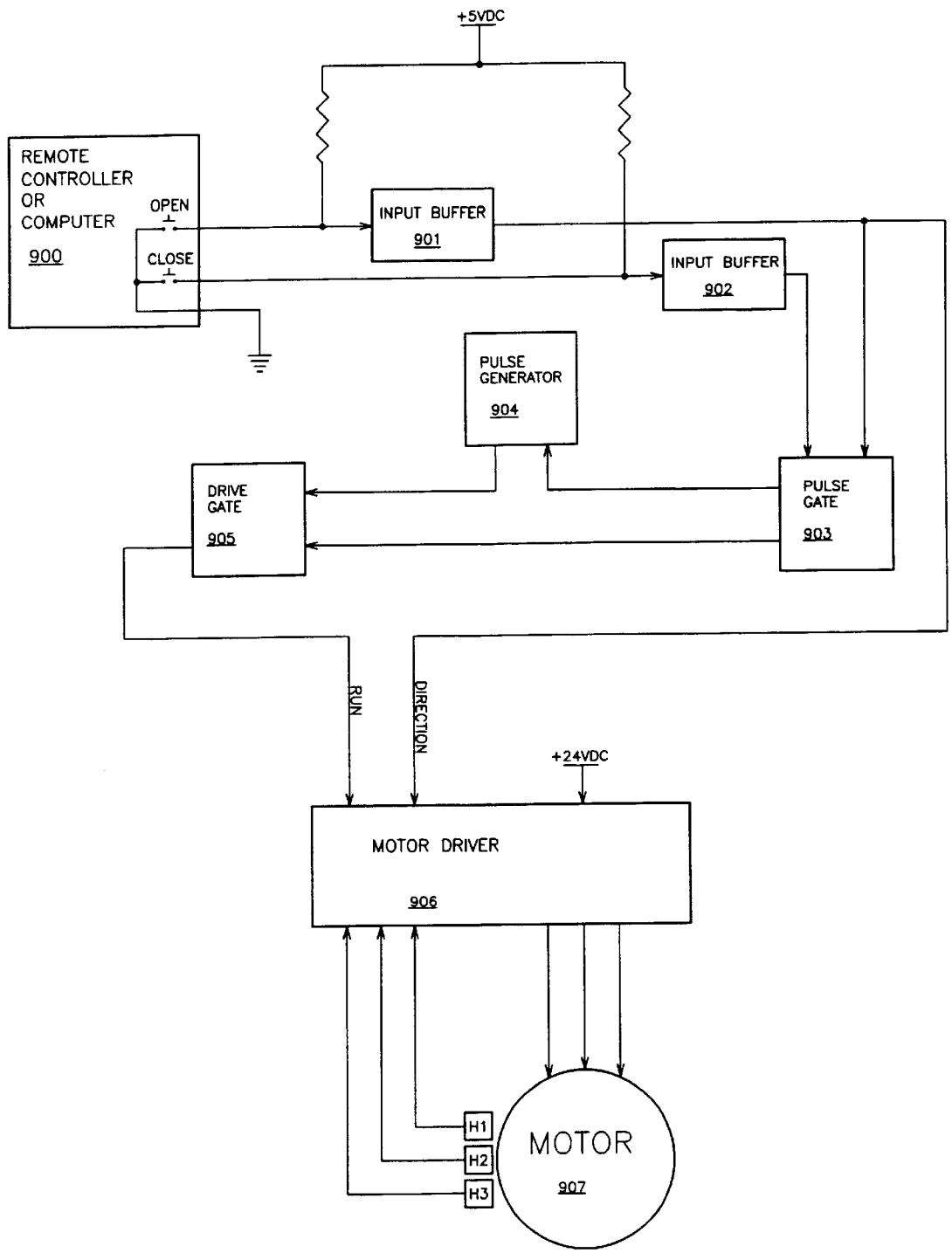
FIG. 19 is a block diagram of a typical motor control used with the present invention; and, FIG. 20 is a block diagram of a circuit employing a fail-safe, battery backup for operating a valve according to the invention.

Referring now to FIG. 19, a block diagram for a valve drive circuit is shown. In FIG. 19, a remote controller or computer 900 furnishes either "open" or "close" control signals to an associated buffer 901, 902. The buffer output is routed to the pulse gate 903. There are two outputs from this circuit. The first pulse gate output is routed to the pulse generator 904 which synchronizes the leading edge of the pulse generator output with the leading edge of the second pulse gate output. The second pulse gate output 903 and the pulse generator output 904 are routed to the drive gate 905. The drive gate 905 sends a pulse which indicates a "run" signal to the motor drive 906. The synchronization of the pulse generator output with the second pulse gate output assures that the drive pulses from the drive gate 905 are initiated only at the onset of the control signal.

The drive gate pulse signals are intermittent and turn on the motor driver output over an on/off ratio of approximately one part in ten. The rotation of the motor is commutated by the three Hall-Effect devices $H_1$, $H_2$, $H_3$ which provide positional feedback of the armature to the motor driver 906, which in turn energizes the appropriate windings to drive the motor 907. The motor then drives the valve toward an "open" or "close" position, dependent on the directional signal sent from the input buffer 902.

Figure 20:
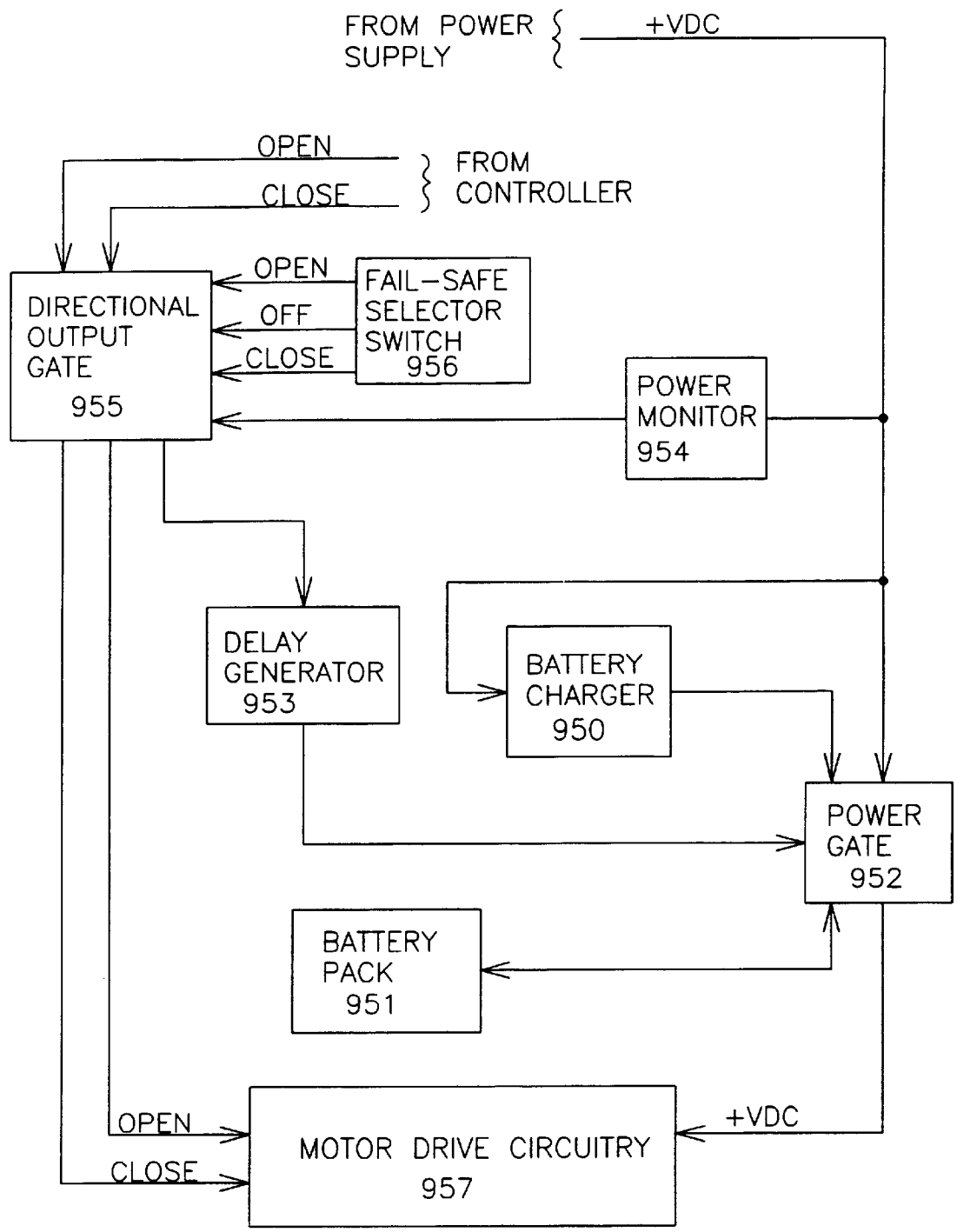

Referring to FIG. 20, a circuit employing a battery for a back-up for operating the valve in case of power failure is shown. FIG. 20 shows that when full voltage is present from the external power supply, the power gate 952 routes the power supply voltage to the motor drive circuitry 957. The power gate 952 also routes the battery charger 950 output to float charge the battery pack 951. The power monitor 954 signals the directional output gate 955 to route the open and close signals from the external controller to the motor drive circuitry 957.

The fail-safe selector switch 956 is a manual lever switch with three positions: OPEN, OFF, and CLOSE. If voltage from the external power supply is lost or falls below a certain level, power monitor 954 signals the directional output gate 955 to route the open or close signals from the fail-safe selector switch 956 to the motor drive circuitry 957. At the onset of external power loss, or whenever fail-safe direction switch 956 is actuated, directional output gate 955 signals the delay generator 953 to initiate a signal to the power gate 952 to route power from the battery pack 951 to the motor drive circuitry 957 for a finite period, typically 30 seconds. This finite period allows the valve to open or close fully in the event of a power failure. While a preferred method of operating the valve in the event of power failure is shown, other equivalent schemes and methods will appear to those skilled in the art.

In the foregoing description and in the following claims, Hall-effect devices have been referred to extensively. These devices are much faster acting than a reed switch, for example. Various optical devices would be suitable except that the "canning" of the motor eliminates the use of these devices. In other words, placing the enclosure between the rotor or armature and the stator eliminates the possibility of using such optical switching devices. Hence, the expression "Hall-effect devices" is intended to include magnetic field devices plus any other equivalents which may be developed in the future.

It will thus be seen that the present invention provides a variety of sealed motors and motor-driven valves including those valves with axially movable valve cores, those with a slide block type valve core and a variety of quarter-turn valves driven by various mechanisms, as well as a method of operating the motor, including pulsing signals to the motor when it is stopped, and a number of valves adapted for having simplified maintenance performed thereon, all such motors and valves having a number of advantages and characteristics, including those expressly pointed out here, and others which are inherent in the invention. Numerous illustrative embodiments of the methods and products of the invention having been shown and described, it is anticipated that variations to the described form of apparatus and methods will occur to those skilled in the art, and that such modifications and changes may be made without departing from the spirit of the invention, or the scope of the appended claims.

What is claimed is:

1. A motor operated valve including a valve body having at least one inlet and at least one outlet, at least one inlet flow passage and at least one outlet flow passage, at least one valve closing member positioned between said inlet and said outlet passage, at least one valve seating means within said body, said at least one valve closing member mounted for movement between open and closed positions, an armature and a drive member for moving said valve closing member, said drive member and said valve closing member being operatively attached so that rotation of said armature and said drive member cause movement of said valve closing member, said armature having a plurality of spaced apart permanent magnets embedded therein, at least one bearing assembly associated with one of said drive member and said armature, said armature being enclosed by a magnetically transparent enclosure closed at one end and hermetically sealed at its other end to said valve body, and, lying closely outside said enclosure, a drive stator, said drive stator including drive windings and plural Hall-effect devices for commutation of said windings.

2. A motor operated valve as defined in claim 1, wherein said at least one valve closing member comprises a valve core and said valve core seating means comprises an annular tapered valve seat.

3. A motor operated valve as defined in claim 1, wherein said drive member comprises a threaded shaft extending axially beyond a plane transverse to the end of said armature, said threaded shaft having a threaded connection to said valve closing member.

4. A motor operated valve as defined in claim 3, wherein at least one of said threaded shaft and said valve closing member includes at least a surface layer of a lubricous material which includes PTFE.

5. A motor operated valve as defined in claim 1, wherein said magnetically transparent enclosure comprises a stainless steel can having a thickness of from about 0.010 inches to about 0.035 inches.

6. A motor operated valve as defined in claim 1, wherein said armature includes a threaded portion core and wherein said drive member comprises a threaded shaft engaged therewith, said threaded shaft being adapted to move axially as a result of rotation of said threaded core.

7. A motor operated valve as defined in claim 1, wherein said at least one valve closing member comprises a valve core adapted to move axially, and wherein said valve body includes at least two inlets or at least two outlets, wherein at least one valve seating means comprises two valve seating means, and wherein said valve core is movable between said at least two seating means and is further positionable between said seating means so as to constitute said valve a mixing valve or a diverting valve, depending on the direction of flow of fluid therethrough.

8. A motor operated valve as defined in claim 1, wherein said valve closing member comprises a valve core movable at least between open and closed positions, said valve core also including a pilot member able to move substantially independently of fluid forces present in said passages, said pilot member being designed to bring pressure fluid forces to bear on said valve core, said valve core responding by movement in response to pressure fluid forces when said pilot member is moved by rotating said drive member.

9. A motor operated valve as defined in claim 8, wherein said pilot member is arranged for free but limited movement between positions wherein said pilot is seated within said core and a position wherein said pilot allows fluid from a high pressure region to bleed into a region of lower pressure.

10. A motor operated valve as defined in claim 8, wherein said pilot member engages said drive member and is driven thereby and wherein said valve core at least partially surrounds said pilot member.

11. A motor operated valve as defined in claim 10, wherein said core includes a pilot seat and a pilot seat retainer received within said core.

12. A motor operated valve as defined in claim 11, wherein said free but limited movement of said pilot member is restricted by engaging said pilot seat on said valve core in one position, and the pilot seat retainer in another position, thereby positively engaging said core for movement in both directions.

13. A motor operated valve as defined in claim 1, wherein said valve closing member comprises a quarter-turn type valve closing member.

14. A motor operated valve as defined in claim 1, wherein said at least one bearing assembly comprises a bearing assembly including a plurality of roller elements, at least one race for said roller elements, and a cage for said roller elements, said cage comprising a stiff, chemically resistant, lubricous synthetic resinous material.

15. A motor operated valve as defined in claim 14, wherein, in use, said cage engages and supports said roller elements on the upper surface and at least the major portion of two circumferential portions of said elements.

16. A motor operated valve as defined in claim 13 wherein said quarter-turn valve comprises a butterfly-type valve closing member.

17. A motor operated valve as defined in claim 13, wherein said quarter-turn type valve closing member comprises a ball type valve member.

18. A motor operated valve as defined in claim 13, wherein said quarter-turn type valve closing member comprises a plug type valve.

19. A motor operated valve as defined in claim 1, wherein said armature includes a threaded member on the interior thereof, wherein said drive member includes threads engageable with said threaded member, said drive member further including a ferrous armature thereon, said magnetically transparent enclosure also enclosing said ferrous armature, whereby said ferrous armature moves axially with said valve core, and a detector lying outside said magnetically transparent enclosure for detecting the axial position of said ferrous armature from time to time.

20. A motor operated valve as defined in claim 1, wherein said valve closing member includes an axially movable valve core, said motor operated valve including means for preventing rotation of said valve core while allowing said valve core to move axially.

21. A motor operated valve as defined in claim 19, wherein said position detector comprises a linear variable differential transformer.

22. A motor operated valve as defined in claim 19, wherein said position detector comprises at least one displacement sensor.

23. A motor operated valve as defined in claim 19, wherein said position detector comprises a plurality of proximity type sensors having a plurality of home positions.

24. A motor operated valve as defined in claim 1, wherein said valve closing member comprises a quarter-turn closing member, having a stem portion driven by a scotch yoke mechanism.

25. A motor operated valve as defined in claim 1, wherein said drive member includes a threaded element and said valve closing member is the stem of a quarter-turn valve operatively attached to a rotatable wheel having a threaded exterior, whereby rotation of said drive member rotates said wheel and rotation of said wheel opens and closes said valve.

26. A motor operated valve including a valve body having at least one inlet and at least one outlet, at least one inlet flow passage and at least one outlet flow passage, at least one valve closing member positioned between said inlet and said outlet passage, at least one valve seating means within said body, said at least one valve closing member mounted for movement between open and closed positions, an armature and a drive member for moving said valve closing member, said drive member and said valve closing member being operatively attached so that rotation of said armature and said drive member cause movement of said valve closing member, said armature having a plurality of spaced apart permanent magnets embedded therein, at least one bearing assembly associated with one of said drive member and said armature, said armature being enclosed by a magnetically transparent enclosure closed at one end and hermetically sealed at its other end to said valve body, and, lying closely outside said enclosure, a drive stator, said drive stator including drive windings and plural Hall-effect devices for commutation of said windings wherein said at least one bearing assembly comprises a bearing assembly and a bushing, said bearing assembly including a plurality of roller elements, at least one race for said roller elements, and a cage comprising a stiff, chemically resistant, lubricous synthetic resinous material, said bushing being made from a filled graphite material.

27. A motor operated valve as defined in claim 26, wherein said stiff chemically resistant, lubricous synthetic resinous material comprises a PTFE material.

28. A motor operated valve as defined in claim 27, wherein said roller elements are ball bearing elements.

29. A motor operated valve as defined in claim 27, wherein said roller elements are plain roller bearing elements or tapered roller bearing elements.

30. A motor operated valve as defined in claim 27, wherein said cage surrounds said roller elements so as to be in sliding contact therewith over at least 15% of the surface area of said roller elements.

31. A two-position motor operated fluid control valve, comprising a valve body having at least plural passages therein, at least one slide member movable axially and operative to change said fluid flow by making a connection, in one position, between first pairs of passages and another position, between second pairs of passages, said slide member being movable axially by rotation of a drive member which is rotatable with an armature of said motor, said motor armature having a plurality of spaced apart permanent magnets embedded therein, at least one bearing assembly associated with one of said drive member and said armature, said armature being enclosed by a magnetically transparent enclosure closed at one end and hermetically sealed at its other end to said valve body and, lying closely outside said enclosure, a drive stator including drive windings and plural Hall-effect devices for commutation of said windings.

32. A two-position motor operated fluid control valve as defined in claim 31, wherein said at least plural passages comprises four passages, and wherein said slide member moves between positions connecting said first and second passages and said third and fourth passages, to a position wherein said first and fourth passages and second and third passages are connected.

33. A two-position motor operated fluid control valve as defined in claim 31, wherein said at least plural passages comprises six passages, and wherein said slide member moves between a first position connecting said first and second passages, said third and fourth passages, and said fifth and sixth passages and a second position connecting said first and sixth passages, said fourth and fifth passages and second and third passages.

34. A two-position motor operated fluid control valve as defined in claim 31, wherein said slide member is rectangular when viewed along the axis of said drive member.

35. A two-position motor operated fluid control valve as defined in claim 31, wherein said bearing assembly is journaled within a bearing retainer, wherein said enclosure has its said other end received in fluid-tight relation between said bearing retainer and a hold-down member, and said closed end of said enclosure includes a bushing for said armature.

36. A two-position motor operated fluid control valve as defined in claim 31, wherein said valve further includes a second, outer enclosure, said fluid control valve further including drive circuitry, said second, outer enclosure being held over said drive circuitry, said stator, said drive windings and said Hall-effect devices in fluid-tight relation.

37. A method of operating a sealed motor which includes a stator, a plurality of drive windings for said stator, plural Hall-effect devices for commutating said drive windings, and a magnetically transparent enclosure enclosing a rotor including plural permanent magnets therein, said method including periodically energizing said drive windings with plural pulses of current, lowering an average current by periodically interrupting said pulses of said current with relatively great intervals of virtually no current at a time when net movement is desired and periodically allowing said armature to come to a virtual stop during each of said intervals, thereby rotating said armature in increments and avoiding damaging heat buildup in said sealed motor.

38. A method of operating a sealed motor as defined in claim 37, wherein said frequency of each of said intervals of virtually no current is from about 4 Hz to 20 Hz.

39. A method of operating a sealed motor as defined in claim 37, wherein said duration of each of said intervals of virtually no current is from about 5 to about 25 milliseconds.

40. A method of operating a sealed motor as defined in claim 37, wherein said intervals of virtually no current occur about every 150 milliseconds and have a duration of about 15 milliseconds.

41. A method of operating a sealed motor as defined in claim 37, wherein said current pulses peak at from about 2 amps to about 5 amps, and said voltage is about 24 to 48 volts.

42. A method of operating a sealed motor as defined in claim 37, wherein, during said pulses of current, at least most of the inertia of said rotor is overcome, and the back emf generated by said rotor rises substantially, said rotor during said current pulse thereby providing maximum torque.

43. A method of operating a sealed motor as defined in claim 37, wherein said intervals of virtually no current comprise intervals of no current, and allowing said armature to come to a virtual stop comprises allowing said armature to come to a stop.

44. A method of operating a sealed motor as defined in claim 37, said sealed motor being associated in use with a valve which includes a valve body, fluid passages, and a movable valve core, said method including maintaining periodic current pulses even when said valve is seated, and continuing to apply said pulses indefinitely.

45. A motor operated valve including a valve body having at least one inlet and at least one outlet, at least one inlet flow passage and at least one outlet flow passage, at least one valve closing member positioned between said inlet and said outlet passage, at least one valve seating means within said body, said at least one valve closing member being mounted for movement between open and closed positions, said valve closing member comprising a valve cartridge, means associated with said valve cartridge for preventing rotation thereof, a bearing carried by said cartridge, an armature, a threaded drive member guided by said bearings, a threaded valve closing member engaged with said drive member and said cartridge so that rotation of said armature and said drive member cause movement of said valve closing member, said armature having a plurality of spaced apart permanent magnets embedded therein, said armature being closely surrounded by a magnetically transparent enclosure retained in a fluid-tight relation between said cartridge and a hold-down member, and exterior to said enclosure, a drive stator with drive windings therein and plural Hall-effect devices for commutation of said windings.

46. A motor operated valve as defined in claim 45, wherein said drive stator, said drive windings and said plural Hall-effect devices are received within a second, outer enclosure, said outer enclosure being held against said valve body in fluid-tight relation.

47. A motor operated valve as defined in claim 46, wherein said magnetically transparent enclosure includes removable fasteners normally holding said enclosure in a fixed position relative to said valve body and said second enclosure includes removable fasteners normally holding it in a fixed position relative to said valve body.

48. A motor operated valve as defined in claim 45, wherein said magnetically transparent enclosure comprises a stainless steel can of from about 0.010 to 0.035 inches in thickness.

49. A motor operated valve as defined in claim 45, whereby removing said second enclosure exposes said drive stator, said drive windings and said Hall-effect devices for maintenance without disturbing said magnetically transparent enclosure, and wherein removing said magnetically transparent enclosure exposes said armature, said cartridge and said valve closing member for removal from said valve body.

* * * * *